(12) United States Patent
Belen et al.

(10) Patent No.: US 12,085,205 B1
(45) Date of Patent: Sep. 10, 2024

(54) PIPE HANGER WITH ANTI-VIBRATION WASHER

(71) Applicant: ASC Engineered Solutions, LLC, Portsmouth, NH (US)

(72) Inventors: Jordan Cameron Belen, West Warwick, RI (US); Matthew William McNamara, Portsmouth, RI (US); Jason F. Santos, Providence, RI (US)

(73) Assignee: ASC ENGINEERED SOLUTIONS, LLC, Exeter, NH (US)

( * ) Notice: Subject to any disclaimer, the term of this patent is extended or adjusted under 35 U.S.C. 154(b) by 52 days.

(21) Appl. No.: 17/953,969

(22) Filed: Sep. 27, 2022

Related U.S. Application Data

(63) Continuation-in-part of application No. 17/023,032, filed on Sep. 16, 2020, now Pat. No. 11,560,969, which is a continuation-in-part of application No. 16/573,129, filed on Sep. 17, 2019, now Pat. No. 11,359,747.

(51) Int. Cl.
 *F16L 3/11* (2006.01)
 *F16B 39/10* (2006.01)
 *F16L 3/133* (2006.01)

(52) U.S. Cl.
 CPC ............ *F16L 3/133* (2013.01); *F16B 39/108* (2013.01); *F16L 3/11* (2013.01)

(58) Field of Classification Search
 CPC .... F16B 39/101; F16B 39/103; F16B 39/105; F16B 39/106; F16B 39/108; F16L 3/11; F16L 3/133; Y10S 411/983
 USPC .... 411/122, 123, 124, 174, 175; 248/58, 59, 248/62
 See application file for complete search history.

(56) References Cited

U.S. PATENT DOCUMENTS

| 21,574 A | 9/1858 | Noblet |
| 142,858 A | 9/1873 | Lowe |

(Continued)

FOREIGN PATENT DOCUMENTS

| EP | 0769647 | 4/1997 |
| GB | 186552 | 10/1922 |
| WO | 2021055479 | 3/2021 |

OTHER PUBLICATIONS

Belen, Jordan Cameron; Final Office Action for U.S. Appl. No. 16/573, 129, filed Sep. 17, 2019, mailed Nov. 6, 2020, 18 pgs.

(Continued)

*Primary Examiner* — Jonathan Liu
*Assistant Examiner* — Guang H Guan
(74) *Attorney, Agent, or Firm* — McAndrews, Held & Malloy, Ltd.

(57) ABSTRACT

A pipe hanger includes a suspension member configured to engage a pipe, the suspension member comprising a side edge and defining a hole through the suspension member; a threaded rod extending through the hole and defining a distal rod end; a nut threaded on the threaded rod, the nut defining a circumferential side; and an anti-vibration washer disposed on the threaded rod between the suspension member and the nut, the anti-vibration washer comprising an edge tab and a nut tab; wherein at least a portion of the edge tab is bent to fold over the side edge of the suspension member, the nut tab is bent to fold over the circumferential side of the nut, and a distal portion of the nut tab is bent to fold over the distal rod end.

6 Claims, 18 Drawing Sheets

(56) References Cited

U.S. PATENT DOCUMENTS

| | | | |
|---|---|---|---|
| 165,167 A | 7/1875 | Jones et al. | |
| 405,632 A | 6/1889 | Warren | |
| 502,195 A | 7/1893 | Jones | |
| 508,757 A | 11/1893 | Reed | |
| 514,217 A | 2/1894 | Devers | |
| 518,066 A | 4/1894 | Kay | |
| 608,162 A | 7/1898 | Swisher | |
| 641,376 A | 1/1900 | Doddridge | |
| 702,642 A * | 6/1902 | Faist | F16B 39/108 411/201 |
| 717,321 A | 12/1902 | Ball | |
| 722,649 A | 3/1903 | Bartley | |
| 753,588 A | 3/1904 | Kunkle | |
| 759,039 A | 5/1904 | Smith | |
| 858,191 A | 6/1907 | Logan | |
| 874,121 A | 12/1907 | Sevcik | |
| 905,842 A * | 12/1908 | Campbell | F16B 39/108 411/123 |
| 924,467 A | 6/1909 | Humphrey | |
| 930,806 A | 8/1909 | Smith | |
| 955,577 A | 4/1910 | Bradshaw | |
| 970,274 A * | 9/1910 | Spencer | F16B 39/08 411/196 |
| 1,077,763 A | 11/1913 | Stark | |
| 1,091,177 A | 3/1914 | Winberg | |
| 1,107,473 A | 8/1914 | Anderson | |
| 1,210,736 A | 1/1917 | Wallace | |
| 1,216,952 A * | 2/1917 | Craig | F16B 39/108 411/204 |
| 1,314,433 A | 8/1919 | Sheets | |
| 1,327,435 A | 1/1920 | Kurtz | |
| 1,372,178 A | 3/1921 | Loving | |
| 1,397,820 A | 11/1921 | Newcomb | |
| 1,512,551 A | 10/1924 | Mcdonald | |
| 1,663,393 A * | 3/1928 | Snyder | F16B 39/108 411/948 |
| 1,707,933 A | 6/1928 | Gibbons | |
| 2,431,480 A | 11/1947 | Hornsby | |
| 3,001,634 A | 9/1961 | Bauder | |
| 3,068,924 A | 12/1962 | Summers | |
| 3,970,707 A | 7/1976 | Shvedov et al. | |
| 4,096,621 A | 6/1978 | Berger et al. | |
| 4,305,557 A | 12/1981 | Kowalski | |
| 4,809,601 A | 3/1989 | Sandstrom | |
| 5,009,386 A | 4/1991 | Berger et al. | |
| 5,082,216 A | 1/1992 | Roth | |
| 5,188,317 A | 2/1993 | Roth | |
| 5,415,509 A | 5/1995 | Martin et al. | |
| 5,848,770 A | 12/1998 | Oliver et al. | |
| D412,833 S | 8/1999 | Cassel | |
| 5,938,173 A | 8/1999 | Hayakawa | |
| 6,050,035 A | 4/2000 | Thompson et al. | |
| 6,053,680 A | 4/2000 | Menke | |
| 6,224,025 B1 | 5/2001 | Alvarez | |
| 6,505,796 B1 | 1/2003 | Roth | |
| 6,588,713 B2 | 7/2003 | Kilkenny | |
| 7,097,141 B2 | 8/2006 | Heath | |
| 7,284,728 B2 | 10/2007 | Connolly | |
| 7,325,776 B2 | 2/2008 | Shibuya | |
| 8,100,368 B2 | 1/2012 | Jackson et al. | |
| 9,038,966 B2 | 5/2015 | Bundren et al. | |
| 9,518,683 B1 | 12/2016 | Heppler | |
| 9,822,667 B2 | 11/2017 | Porter et al. | |
| 9,903,524 B2 | 2/2018 | Lange et al. | |
| 10,184,598 B2 | 1/2019 | Williams et al. | |
| 10,239,192 B2 | 3/2019 | Guyomard | |
| 10,686,345 B2 | 6/2020 | Evans | |
| 10,851,822 B2 * | 12/2020 | Hellin | F16B 11/006 |
| 10,900,382 B2 * | 1/2021 | Gendraud | F01D 25/243 |
| 11,359,747 B2 | 6/2022 | Belen et al. | |
| 11,560,969 B2 | 1/2023 | Belen et al. | |
| 11,781,584 B2 * | 10/2023 | Pitt | F16B 37/043 411/175 |
| 2004/0136806 A1 | 7/2004 | Montgomery et al. | |
| 2006/0138286 A1 | 6/2006 | Connolly | |
| 2009/0321587 A1 | 12/2009 | Thackeray | |
| 2011/0027039 A1 | 2/2011 | Blair | |
| 2012/0318934 A1 | 12/2012 | Thomas | |
| 2013/0126681 A1 | 5/2013 | Greenfield | |
| 2014/0017027 A1 | 1/2014 | Benzing | |
| 2015/0101174 A1 | 4/2015 | Williams et al. | |
| 2016/0003288 A1 | 1/2016 | Richards | |
| 2017/0184144 A1 | 6/2017 | Lee | |
| 2021/0080032 A1 | 3/2021 | Belen et al. | |
| 2021/0080033 A1 | 3/2021 | Belen et al. | |
| 2022/0228677 A1 | 7/2022 | Belen et al. | |
| 2023/0121886 A1 | 4/2023 | Belen et al. | |
| 2023/0131511 A1 | 4/2023 | Belen et al. | |
| 2023/0135991 A1 | 5/2023 | Belen et al. | |

OTHER PUBLICATIONS

Belen, Jordan Cameron; Final Office Action for U.S. Appl. No. 16/573,129, filed Sep. 17, 2019, mailed Sep. 28, 2021, 24 pgs.
Belen, Jordan Cameron; Non-Final Office Action for U.S. Appl. No. 16/573, 129, filed Sep. 17, 2019, mailed Mar. 31, 2021, 20 pgs.
Belen, Jordan Cameron; Non-Final Office Action for U.S. Appl. No. 16/573,129, filed Sep. 17, 2019, mailed Jul. 15, 2020, 28 pgs.
Belen, Jordan Cameron; Notice of Allowance for U.S. Appl. No. 16/573,129, filed Sep. 17, 2019, mailed Jan. 4, 2022, 10 pgs.
Belen, Jordan Cameron; Requirement for Restriction/Election for U.S. Appl. No. 16/573,129, filed Sep. 17, 2019, mailed Jun. 5, 2020, 9 pgs.
Defense Documentation Center (U.S.), Plastics: An ASTIA Report Bibliography, 1962, https://books.google.com/books/about/Plastics.html?id=c9grAQAAMAAJ. (Year: 1962).
Belen, Jordan Cameron; Final Office Action for U.S. Appl. No. 17/023,032, filed Sep. 16, 2020, Jul. 27, 2022, 21 pgs.
Belen, Jordan Cameron; Non-Final Office Action for U.S. Appl. No. 17/023,032, filed Sep. 16, 2020, mailed Feb. 11, 2022, 28 pgs.
Belen, Jordan Cameron; Notice of Allowance for U.S. Appl. No. 17/023,032, filed Sep. 16, 2020, mailed Sep. 23, 2022, 15 pgs.
Belen, Jordan Cameron; Requirement for Restriction/Election for U.S. Appl. No. 17/023,032, filed Sep. 16, 2020, mailed Dec. 29, 2021, 9 pgs.
Belen, Jordan Cameron; International Preliminary Report on Patentability for PCT Application No. PCT/US2020/051074, filed Sep. 16, 2020, mailed Nov. 12, 2021, 38 pgs.
Belen, Jordan Cameron; International Search Report and Written Opinion for PCT Application No. PCT/US2020/051074, filed Sep. 16, 2020, mailed Jan. 27, 2021, 15 pgs.
Belen, Jordan Cameron; Non-Final Office Action for U.S. Appl. No. 18/086,244, filed Dec. 21, 2022, mailed Apr. 26, 2023, 28 pgs.
Belen, Jordan Cameron; Non-Final Office Action for U.S. Appl. No. 18/086,268, filed Dec. 21, 2022, mailed Apr. 26, 2023, 34 pgs.
Belen, Jordan Cameron; Non-Final Office Action for U.S. Appl. No. 17/712,481, filed Apr. 4, 2022, mailed Jul. 12, 2023, 42 pgs.
Belen, Jordan Cameron; Non-Final Office Action for U.S. Appl. No. 18/086,098, filed Dec. 21, 2022, mailed Jul. 19, 2023, 29 pgs.
Belen, Jordan Cameron; Final Office Action for U.S. Appl. No. 18/086,244, filed Dec. 21, 2022, mailed Aug. 24, 2023, 27 pgs.
Belen, Jordan Cameron; Final Office Action for U.S. Appl. No. 17/712,481, filed Apr. 4, 2022, mailed Oct. 23, 2023, 32 pgs.
Belen, Jordan Cameron; Final Office Action for U.S. Appl. No. 18/086,098, filed Dec. 21, 2022, mailed Nov. 3, 2023, 18 pgs.
Belen, Jordan Cameron; Non-Final Office Action for U.S. Appl. No. 18/086,244, filed Dec. 21, 2022, mailed Dec. 18, 2023, 31 pgs.
Belen, Jordan Cameron; Final Office Action for U.S. Appl. No. 18/086,268, filed Dec. 21, 2022, mailed Nov. 1, 2023, 39 pgs.
Belen, Jordan Cameron; Non-Final Office Action for U.S. Appl. No. 17/712,481, filed Apr. 4, 2022, mailed Feb. 14, 2024, 30 pgs.
Belen, Jordan Cameron; Non-Final Office Action for U.S. Appl. No. 18/086,268, filed Dec. 21, 2022, mailed Mar. 11, 2024, 35 pgs.

* cited by examiner

PIPE HANGER WITH ANTI-VIBRATION WASHER

CROSS-REFERENCE TO RELATED APPLICATIONS

The present application is a continuation-in-part of U.S. patent application Ser. No. 17/023,032, filed Sep. 16, 2020, which is a continuation-in-part of U.S. patent application Ser. No. 16/573,129, filed Sep. 17, 2019, which issued into U.S. Pat. No. 11,359,747 on Jun. 14, 2022, each of which is hereby specifically incorporated by reference herein in its entirety.

TECHNICAL FIELD

This disclosure relates to hanging pipes. More specifically, this disclosure relates to a pipe hanger with a lock tab washer.

BACKGROUND

Pipes, such as water pipes in a building for sprinkler systems or residential or commercial water use, can be suspended from ceilings by pipe hangers, such as clevis hangers. The parts of a clevis hanger can be secured by attachment mechanisms such as nuts and bolts. These nuts and bolts can loosen, especially in the presence of movement, such as vibrations due to seismic events or everyday vibrations from foot traffic or machine vibrations, or even vibrations from fluid flow and water hammer in the pipes themselves.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a hanger for a pipe, the hanger comprising: a suspension member configured to engage the pipe, the suspension member comprising a side edge and defining a hole in through the suspension member; a threaded rod extending through the hole; a nut threaded on the threaded rod; and a lock tab washer disposed on the threaded rod between the suspension member and the nut, the lock tab washer comprising a first tab and a second tab, the first tab bent over a side edge of the suspension member, the first tab configured to prevent the lock tab washer from rotating with respect to the suspension member, the second tab bent over a circumferential side of the nut, the second tab configured to prevent the nut from rotating with respect to the lock tab washer.

Also disclosed is a method of securing a pipe in a hanger, the method comprising: supporting the pipe with a suspension member; inserting a threaded rod through the suspension member; placing a lock tab washer on the threaded rod; threading a nut on the threaded rod; preventing the lock tab washer from rotating with respect to the suspension member by folding a first tab of the lock tab washer over a side edge of the suspension member; and preventing the nut from rotating with respect to the lock tab washer by folding a second tab of the lock tab washer over a circumferential side of the nut.

Moreover, disclosed is an anti-vibration washer comprising an edge tab extending towards a first end of the anti-vibration washer, the edge tab defining a first tab section and a second tab section; and a nut tab extending towards a second end of the anti-vibration washer opposite the first end, the nut tab defining a proximal portion and a distal portion; wherein the anti-vibration washer is configurable in a flat configuration and a folded configuration; and wherein, in the folded configuration, the second tab section is bent relative to the first tab section in a first direction, the nut tab is bent relative to first tab section in a second direction opposite the first direction, and the distal portion is bent relative to the proximal portion.

Additionally, disclosed is a pipe hanger comprising a suspension member configured to engage a pipe, the suspension member comprising a side edge and defining a hole in through the suspension member; a threaded rod extending through the hole and defining a distal bolt end; a nut threaded on the threaded rod, the nut defining a circumferential side; and an anti-vibration washer disposed on the threaded rod between the suspension member and the nut, the anti-vibration washer comprising an edge tab and a nut tab; wherein at least a portion of the edge tab is bent to fold over the side edge of the suspension member, the nut tab is bent to fold over the circumferential side of the nut, and a distal portion of the nut tab is bent to fold over the distal bolt end.

Also disclosed is a method of assembling a pipe hanger, the method comprising inserting a threaded bolt through a suspension member, the threaded bolt defining a distal bolt end; placing an anti-vibration washer on the threaded bolt, the anti-vibration washer defining an edge tab and a nut tab; tightening a nut on the threaded bolt, the anti-vibration washer disposed between the nut and the suspension member, the nut defining a circumferential side; folding at least a portion of the edge tab over a side edge of the suspension member; folding the nut tab over the circumferential side of the nut; and folding a distal portion of the nut tab over the distal bolt end of the threaded bolt.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
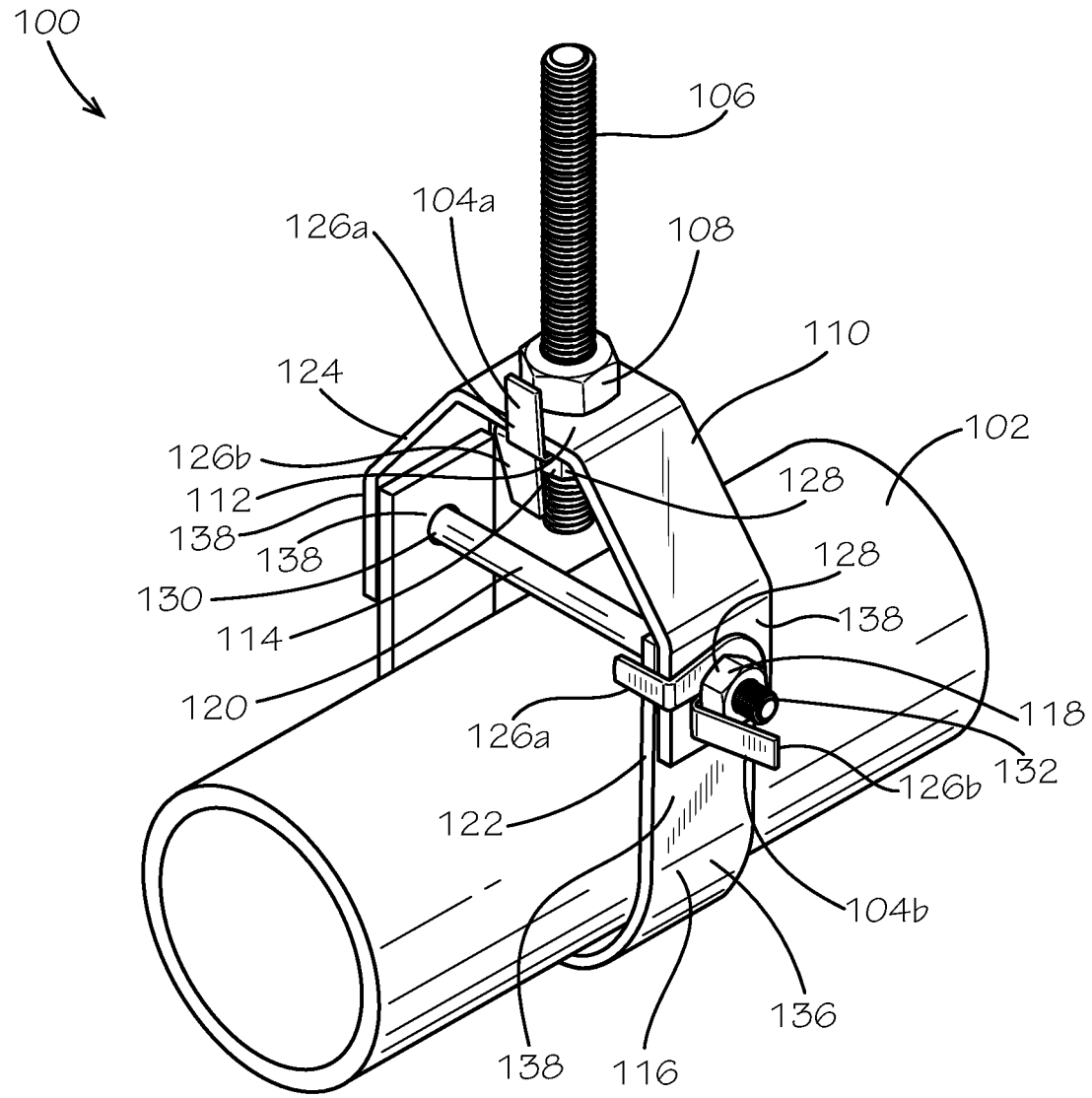
FIG. 1 is a perspective view of a pipe hanging from a hanger comprising a lock tab washer according to one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods.

Thus, if there are a variety of additional steps that can be performed it is understood that each of these additional steps can be performed with any specific aspect or combination of aspects of the disclosed methods.

The use of the directional terms herein, such as right, left, front, back, top, bottom, and the like can refer to the orientation shown and described in the corresponding figures, but these directional terms should not be considered limiting on the orientation or configuration required by the present disclosure. The use of ordinal terms herein, such as first, second, third, fourth, and the like can refer to elements associated with elements having matching ordinal numbers. For example, a first light bulb can be associated with a first light socket, a second light bulb can be associated with a second light socket, and so on. However, the use of matching ordinal numbers should not be considered limiting on the associations required by the present disclosure. An element such as a light bulb can be a genus element that encompasses species elements such as an upper light bulb and a lower light bulb. As such, a numeric designator such as 100 can refer to the light bulb and an alphanumeric designator such as 100a and 100b can refer to the upper light bulb and the lower light bulb, for example and without limitation.

Disclosed is a pipe hanger comprising a lock tab washer and associated methods, systems, devices, and various apparatus. It would be understood by one of skill in the art that the hanger is described in but a few exemplary embodiments among many. No particular terminology or description should be considered limiting on the disclosure or the scope of any claims issuing therefrom.

FIG. 1 is a perspective view of a pipe 102 hanging from a pipe hanger 100 comprising a lock tab washer 104. In this aspect, the hanger 100 can comprise two lock tab washers 104, such as a top lock tab washer 104a and a side lock tab washer 104b. The hanger 100 can be a clevis hanger 100 and can comprise a threaded rod 106, a top nut 108 disposed on the threaded rod 106, and an upper clevis 110 disposed on the threaded rod 106 below the top nut 108. The upper clevis 110 can be, for example and without limitation, a strap stamped from sheet metal. The upper clevis 110 can receive the threaded rod 106 through a rod hole (hidden behind top nut 108) in a top flattened section 112 of the upper clevis 110. The top lock tab washer 104a can be placed on the threaded rod 106 below the rod hole of the upper clevis 110. A securing nut 114 (shown more clearly in FIG. 4) can be disposed on the threaded rod 106 below the lock tab washer 104.

The top lock tab washer 104a can comprise two tabs 126, the two tabs being a first tab 126a folded over a side edge 124 of the upper clevis 110 and a second tab 126b folded over a circumferential side 128 of the nut 114. The tabs 126 can be configured to prevent the washer 104a from rotating with respect to the upper clevis 110 and to prevent the securing nut 114 from rotating with respect to the washer 104a. The first tab 126a can also be called an edge tab 126a, and the second tab 126b can also be called a nut tab 126b. In addition, the pipe 102 can prevent the upper clevis 110 and the hanger 100 from rotating with respect to the threaded rod 106. As such, the top lock tab washer 104a can prevent the securing nut 114 from loosening, and from releasing the pipe 102 and the clevis hanger 100 from the rod 106. The washer 104a can therefore provide vibration resistance to the hanger 100.

The hanger 100 can further comprise a lower clevis 116 that is configured to hold the pipe 102. The lower clevis 116 that holds the pipe 102 can be a U-shaped strap and can, for example and without limitation, be stamped from sheet metal. In combination, the upper clevis 110 and the lower clevis 116 can define a suspension member 136. In some aspects, the lower clevis 116 and the upper clevis 110 can be monolithic with each other such that the clevises 116,110 define a single suspension member 136 formed from one piece of material, such as cast iron, for example and without limitation. In other aspects, the suspension member 136 can comprise one or more parts and can be similar to other pipe hangers currently on the market and can be any assembly of parts configured to attach a pipe 102 to a threaded rod 106. The lower clevis 116 can attach to the upper clevis 110 by a bolt 120, which can also be called a threaded rod 120. Each of the clevises 110,116 can comprise two flattened ends 138, each flattened end 138 defining a hole through which the bolt 120 can be inserted. Specifically, the bolt 120 can be inserted into a first side hole (hidden behind the lower clevis 116) in the upper clevis 110, a first side hole 130 in the lower clevis 116, a second side hole (hidden behind the upper clevis 110) in the lower clevis 116, and a second side hole (hidden behind a side nut 118) in the upper clevis 110, in order from left to right with respect to the viewing angle of FIG. 1. The bolt 120 can be secured on the hanger 100 by the side nut 118, such as a hexagonal (hex) nut. A side lock tab washer 104b can be disposed on the bolt 120 between the upper clevis 110 and the nut 118. The bolt 120 can, for example and without limitation, be threaded only partially on a tail-most 132 end of the bolt 120.

The side lock tab washer 104b can comprise tabs 126 that prevent the nut 118 from rotating on the bolt 120, similar to the top lock tab washer 104a. In the current aspect, the tabs 126 can comprise a first tab 126a and a second tab 126b, similar to the top lock tab washer 104a. The first tab 126a can fold over the side edge 124 of the upper clevis 110 and a side edge 122 of the lower clevis 116, preventing the washer 104b from rotating. The second tab 126b can fold over the side 128 of the nut 118, preventing the nut 118 from rotating with respect to the hanger 100.

The lock tab washer 104 can provide several functions in one unit. It can prevent the nuts 114,118 from loosening due to vibrations, particularly when the hangers 100 are supporting overhead pipes 102. Vibrations can be transmitted through the pipes 102 or from the floor above. It may be inconvenient or difficult to check the tightness of fasteners (such as the nuts 118) when the hangers 100 are high above typical human reach and often hidden behind ceiling tiles or drywall ceilings. In addition, the washers 104 can be configured to be visible from a location far below the hanger 100, thereby allowing personnel to identify which components are vibration-resistant by visual inspection while standing on the floor, such as during construction and shortly after the hangers 100 are installed. The washers 104 can be sized and colored to provide visibility. For example, bright colors and high reflectivity materials can be used.

The washers 104 can be carbon steel or any suitable material known in the art, and they can be covered with a layer to provide corrosion-resistance as well as to increase visibility. For example, the washers can be pre-galvanized or zinc-electroplated. They can be coated in yellow or purple chromate, painted orange, or covered or dipped in plastisol, rubber, or epoxy, for example and without limitation.

Figure 2A:
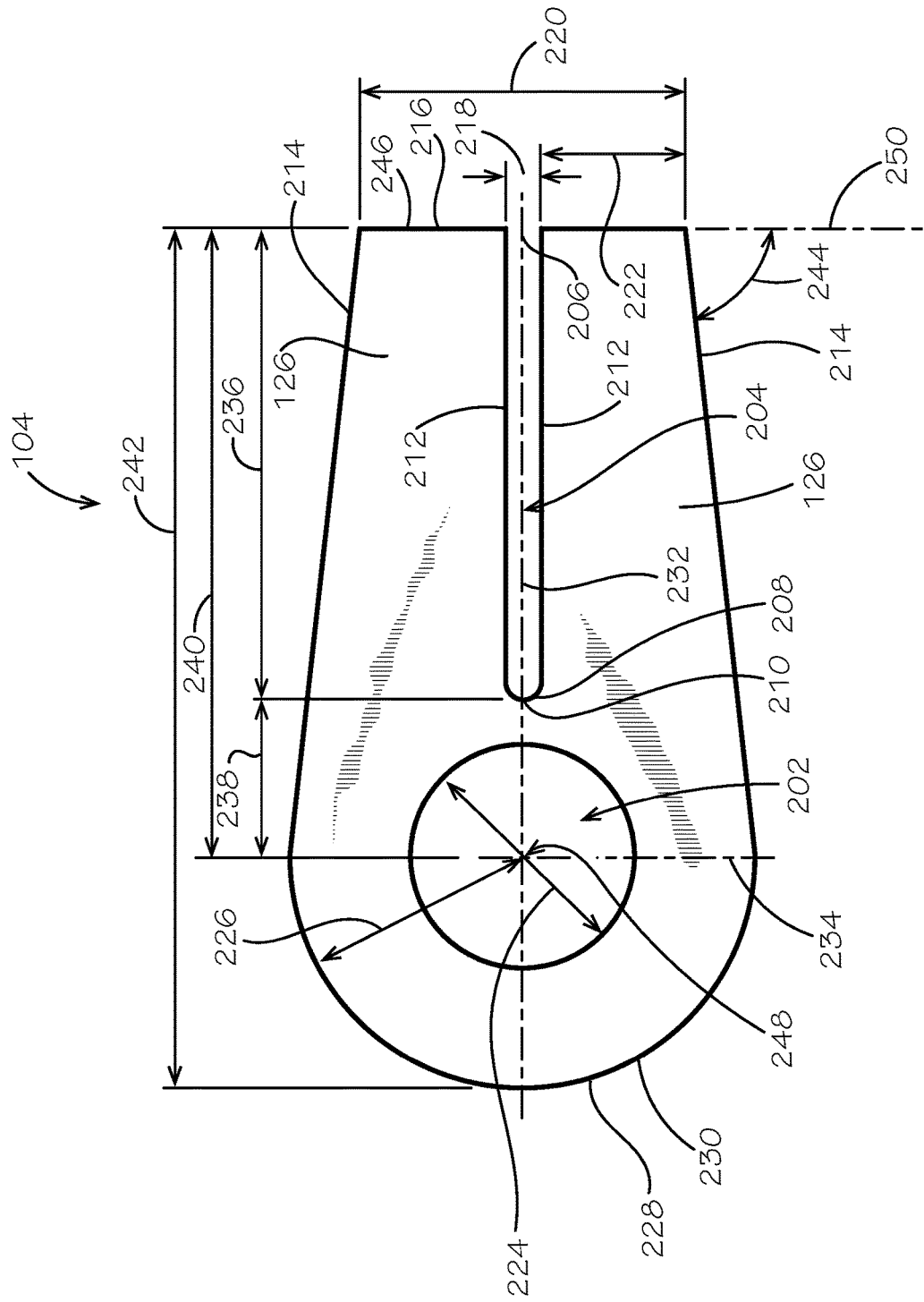
FIG. 2A is a top view of the lock tab washer of FIG. 1, in a flat configuration.

FIG. 2A is a top view of the lock tab washer 104 of FIG. 1 in a flat configuration, according to one aspect of the current disclosure. In the present aspect, the washer 104 can define a circular hole 202 at a first end 230 of the washer 104 and a slit 204 at a second end 216 of the washer 104 opposite the first end 230. The slit 204 can separate the tabs 126 of the washer 104. The slit 204 can define an open end 206 at the second end 216 and a closed end 208 proximate the hole 202. The closed end 208 can define a curvilinear edge 210 such as a half circle. The slit 204 and the hole 202 can be separated by washer material, such that the hole 202 and the slit 204 are noncontiguous spaces. The slit 204 can define a width 218 that is less than, for example, one-fourth a diameter 224 of the circular hole 202. The slit 204 can also define a length 236.

The first end 230 of the washer 104 can define a curvilinear edge 228, such as a half circle sharing a same center 248 as the circular hole 202. The curvilinear edge 228 and the center 248 can define a radius 226 therebetween. The closed end 208 of the slit 204 and the center 248 of the hole 202 can define a distance 238 therebetween. The second end 216 and the center 248 can define a distance 240 therebetween. The washer 104 can define a washer length 242.

Each tab 126 can have an outer side edge 214 and an inner side edge 212, wherein each of the outer side edges 214 slope toward each other from the first end 230 to the second end 216. The second end 216 can define a straight edge 246. The outer side edge 214 of each respective tab 126 can define an outside angle 244 with a second end axis 250 defined by the straight edge 246. The washer 104 can be symmetric about a longitudinal axis 232 defined by the slit 204. The washer 104 can define a width axis 234 that is perpendicular to the longitudinal axis 232 and runs through the center 248 of the hole 202. The second end 216 can define a width 220, and a width 222 of the tab 126 at the second end 216 can also be defined.

Figure 2B:
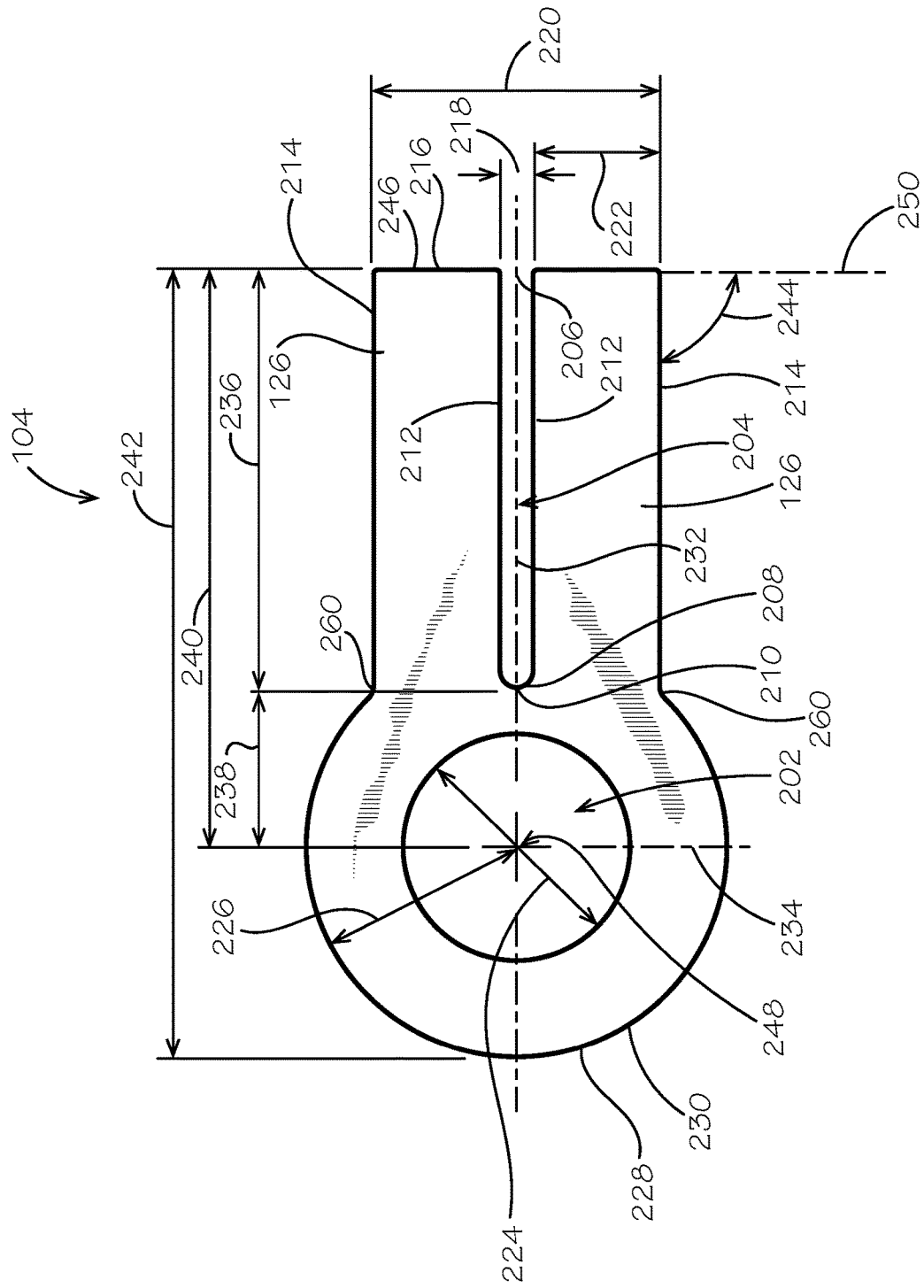
FIG. 2B is a top view of the lock tab washer, in a flat configuration and according to another aspect of the present disclosure.

FIG. 2B is a top view of the lock tab washer 104 in a flat configuration, according to another aspect of the present disclosure. The curvilinear edge 228 at the first end 230 can be a circle that is concentric with the hole 202. The circular curvilinear edge 228 can meet the tabs 126 at one or more inflection points 260. Additionally, the outside edges 214 of each respective tab 126 can be parallel to each other. Similar parts of FIG. 2A and FIG. 2B can have the same names and use the same designators.

Figure 3A:
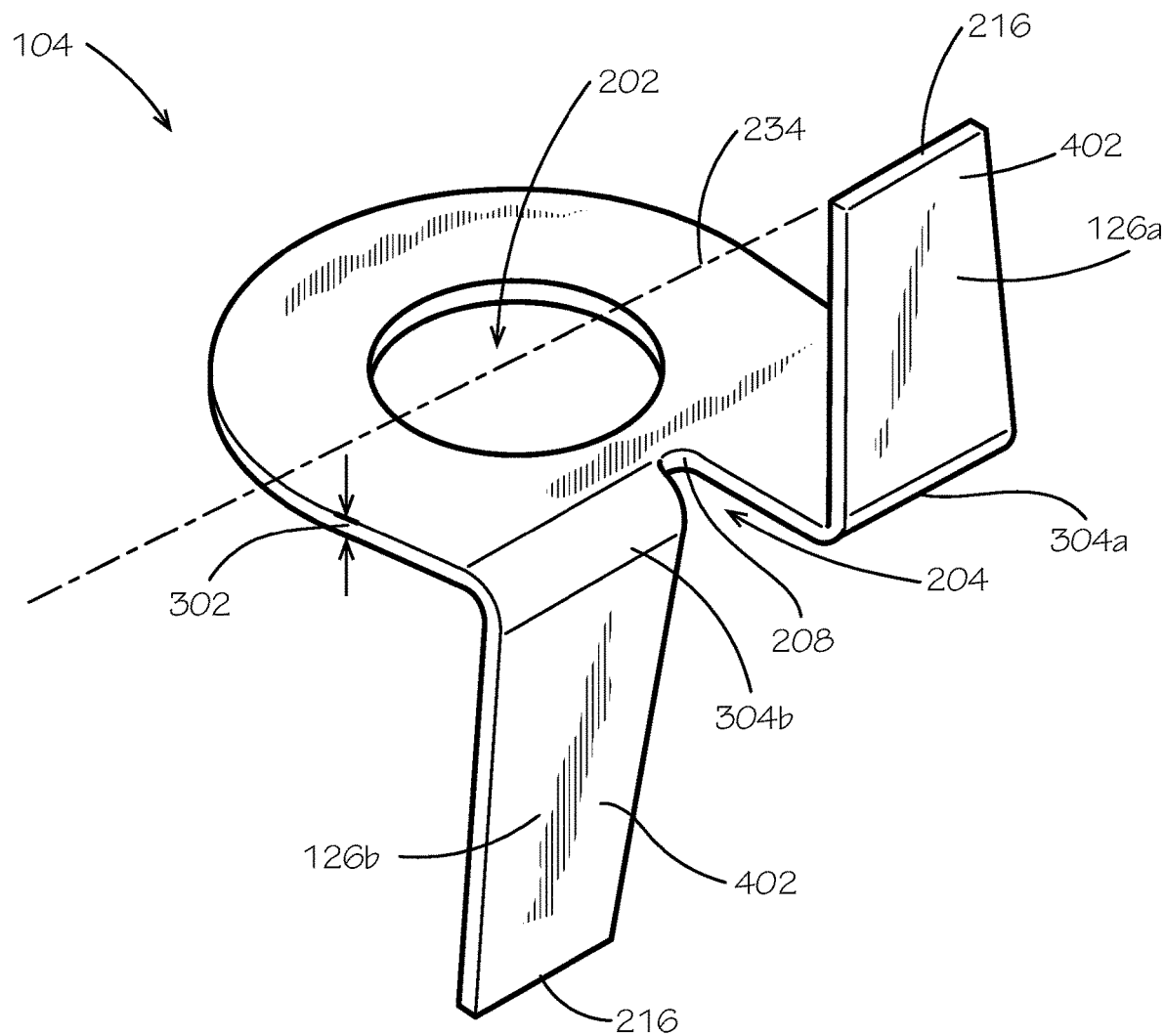
FIG. 3A is a perspective view of the lock tab washer of FIG. 2A, in a folded configuration.

FIG. 3A is a perspective view of the lock tab washer 104 in a folded, or a secured, configuration. The washer 104 can define a thickness 302. The first tab 126a can bend at a first bend line 304a between the closed end 208 and the open end 206 of the slit 204 (as shown in FIG. 2A). In the current aspect, the first bend line 304a can be approximately one-third of the length 236 from the closed end 208 to the second end 216. The first tab 126a can be folded up in about a 90-degree angle. The second tab 126b can fold in a direction opposite the first tab 126a (down, in the current aspect) at a second bend line 304b proximate to the closed end 208 of the slit 204, relative to the first bend line 304a. In the current aspect, a bent section 402 of the first tab 126a of each washer 104 can be shorter than the bent section 402 of the second tab 126b. This can be due to the first bend line 304a being closer to the open end 206 (shown in FIG. 2A) of the slit 204. The fold lines 304a,b can run substantially parallel to the width axis 234 running through the hole 202. The washer 104 can be stamped from sheet metal, for example and without limitation.

Figure 3B:
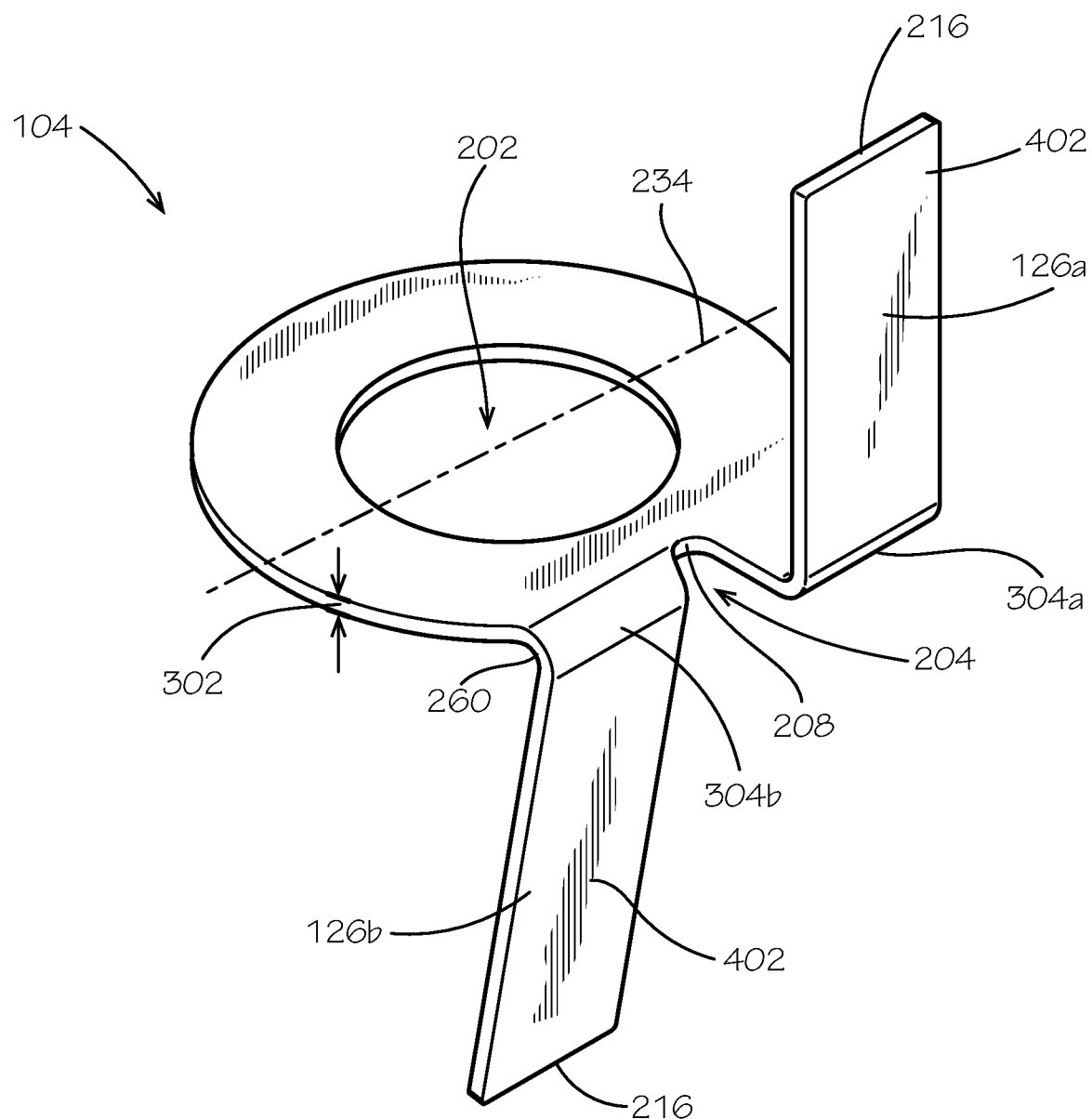
FIG. 3B is a perspective view of the lock tab washer of FIG. 2B, in a folded configuration.

FIG. 3B is a perspective view of the lock tab washer 104 of FIG. 2B in the folded configuration. One of the inflection points 260 can be seen in this view. Similar parts of FIG. 3A and FIG. 3B can have the same names and use the same designators.

Figure 4:
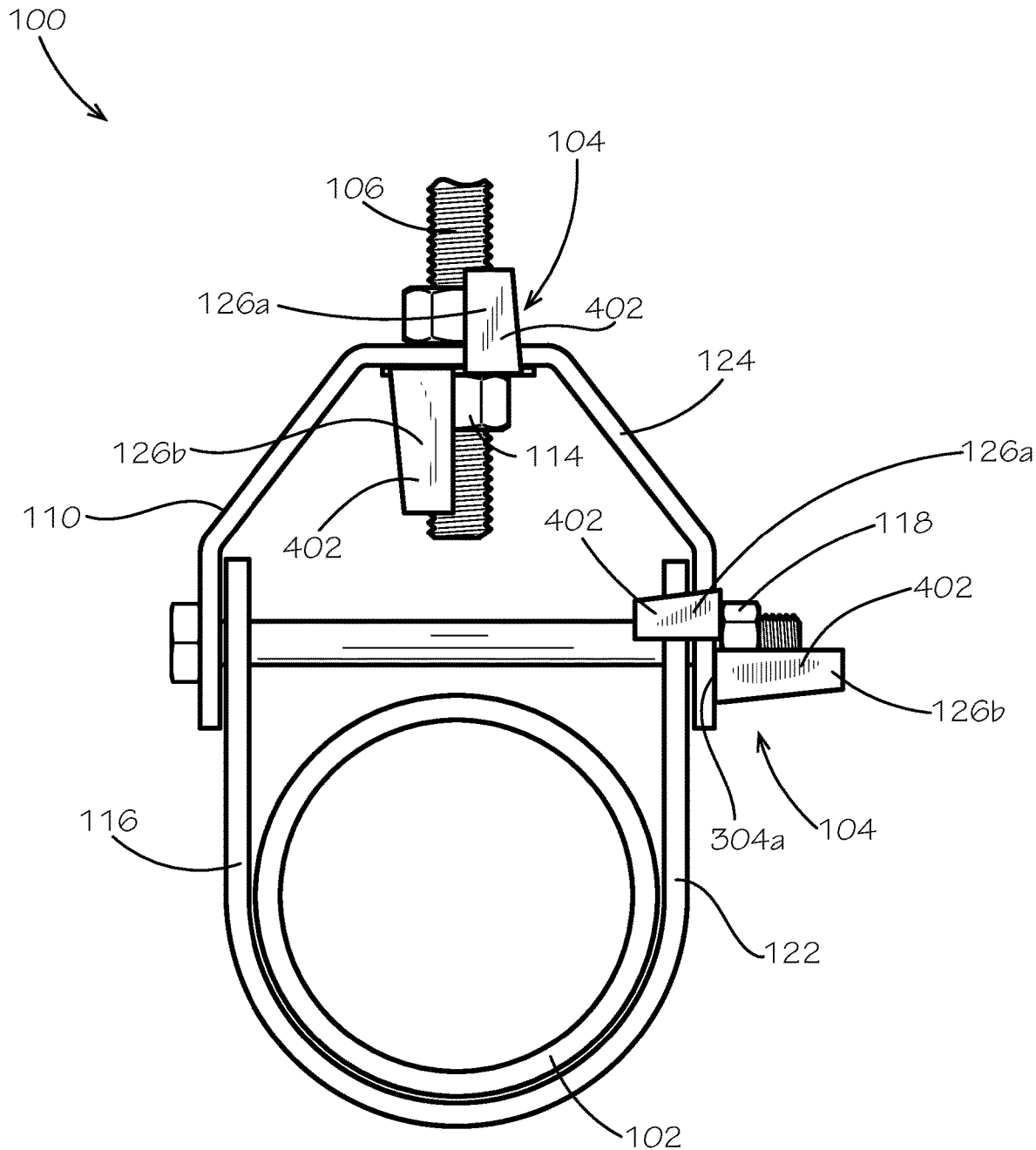
FIG. 4 is a front view of the hanger.

FIG. 4 shows a front (down the pipe 102) view of the hanger 100 in FIG. 1. As shown (also in FIG. 3A and FIG. 3B), the bent section 402 is shorter than the bent section 402 of the second tab 126b.

Figure 5:
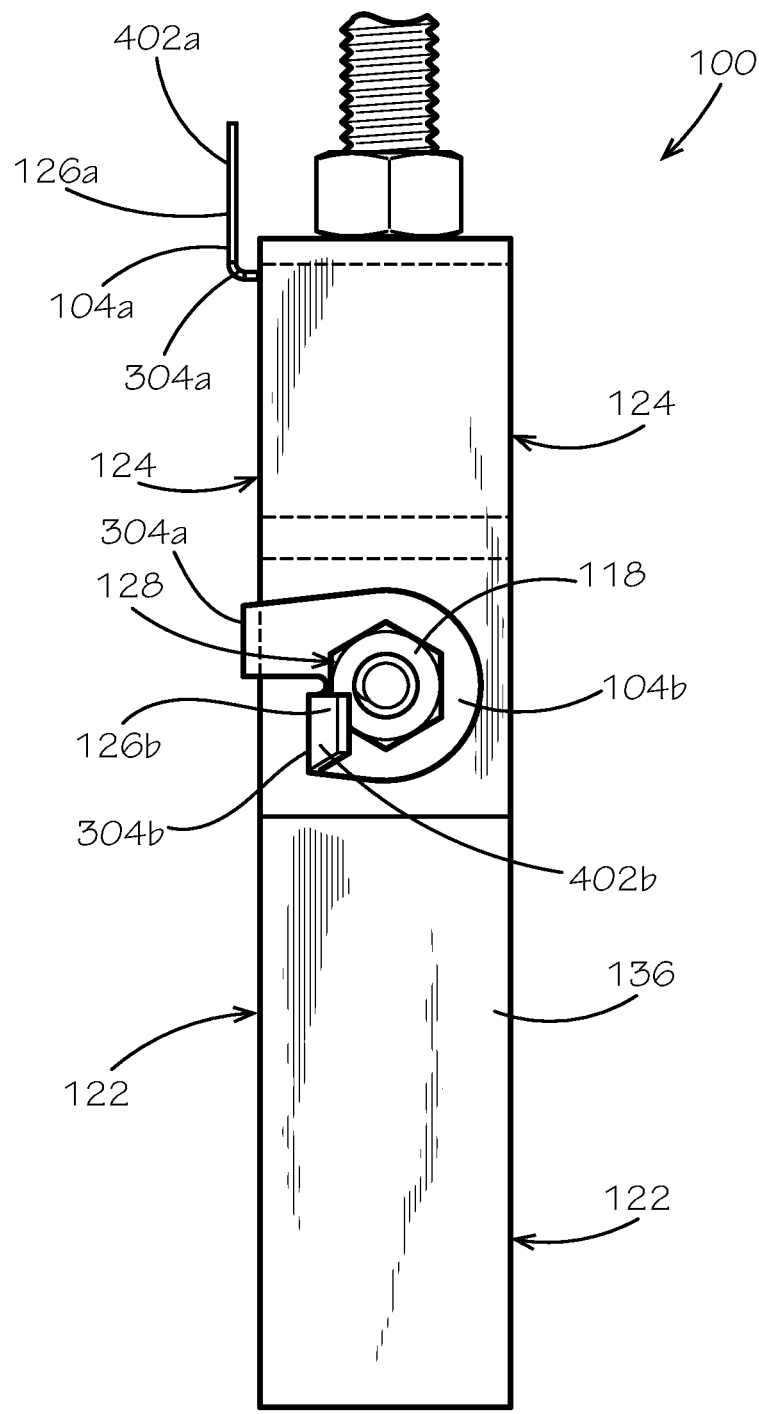
FIG. 5 is a side view of the hanger.

FIG. 5 shows a side view of the hanger 100. A second bent section 402b of the second tab 126b of the side lock tab washer 104b can contact the side 128 of the nut 118. The side edges 122, 124 of the upper and lower clevises 110,116 can be farther from the hole 202 (shown in FIG. 3A and FIG. 3B) of the washer 104 than the circumferential side 128 of the nuts 114, 118. Thus, the bend lines 304a,b can be located differently on each respective tab 126.

As shown by the first tab 126a of the lock tab washer 104a, the first tabs 126a of each of the lock tab washers 104 can be bent at approximately 90-degrees, and a first bent section 402a may not contact the side edges 122,124 of the suspension member 136. The first tabs 126a can fold over either of the two side edges 122, 124 of each clevis 110,116. In other aspects, the user can bend the tabs 126 in various configurations such that the nut 118 is prevented from rotating with respect to the upper and lower clevises 110, 116. For example, the bend lines 304a,b of the side lock tab washer 104b can contact the upper clevis 110 or the nut 118, allowing less space for slippage.

Figure 6:
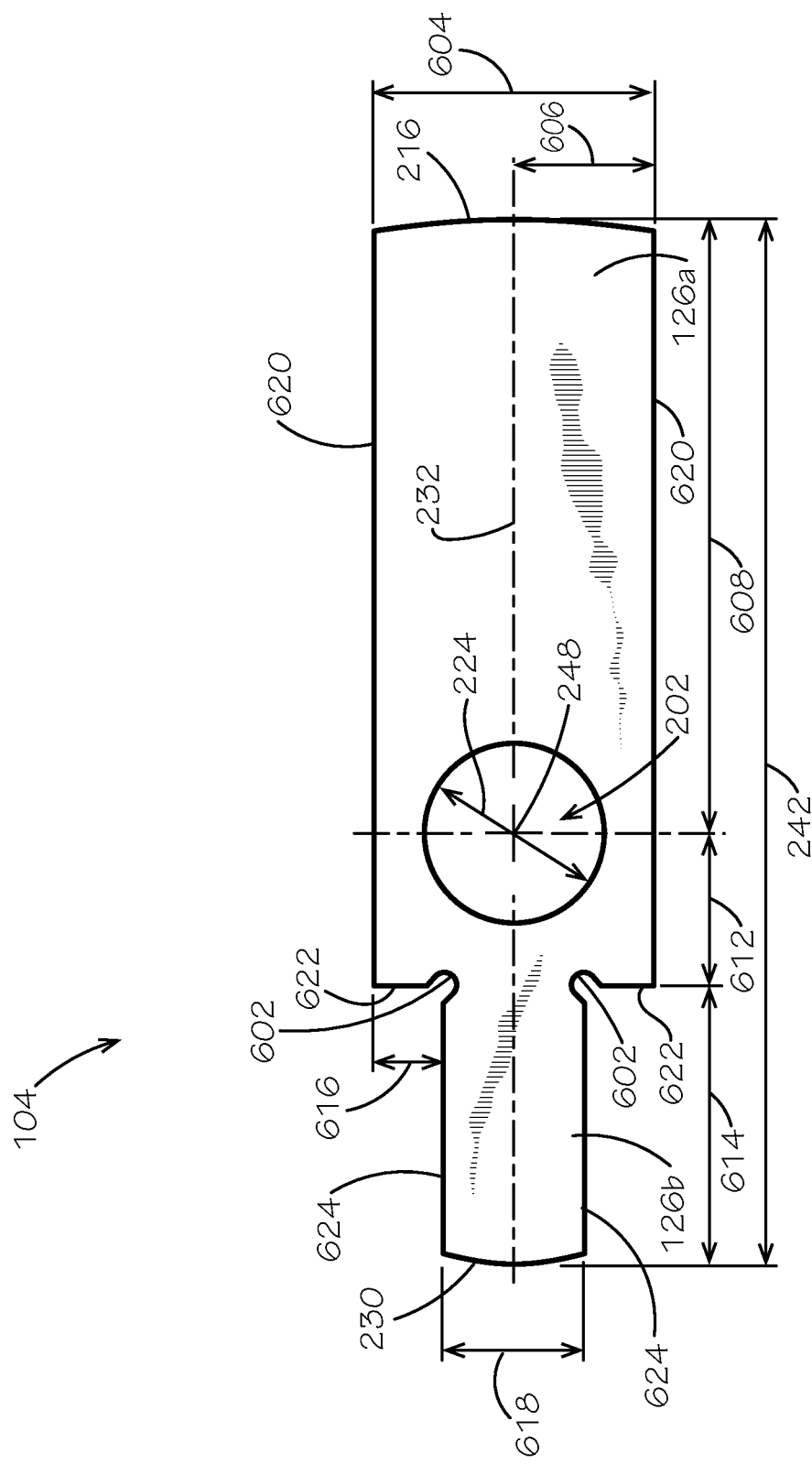
FIG. 6 is a top view of the lock tab washer in accordance with another aspect of the present disclosure.

FIG. 6 is a top view of the lock tab washer 104, in another aspect in accordance with the present disclosure. The first or the edge tab 126a can be distal from the second or the nut tab 126b across the washer hole 202 and can extend in an opposite direction from the washer hole 202. The hole 202 defines the hole diameter 224. In the present aspect, the nut tab 126b can be proximate the first end 230, and the edge tab 126a can be proximate the second end 216. The first and the second ends 230,216 can be curvilinear. The nut tab 126b can define a nut tab width 618 that is less than an edge tab width 604 of the edge tab 126a. The longitudinal axis 232 can define a plane of reflectional symmetry. The nut tab 126b can also comprise two nut tab side edges 624, each meeting a washer shoulder 622 at a relief notch 602 that can be recessed and curvilinear. Each shoulder 622 can join to a lateral edge 620 of the edge tab 126a. The nut tab 126b can also define a nut tab length 614 that is shorter than half the washer length 242. Further lengths can be defined, such as a shoulder width 616, a distance 608 from the second end 216 to the hole center 248, a distance 612 from the shoulder 622 to the hole center 248, and a distance 606 from the longitudinal axis 232 to the lateral edge 620.

Figure 7:
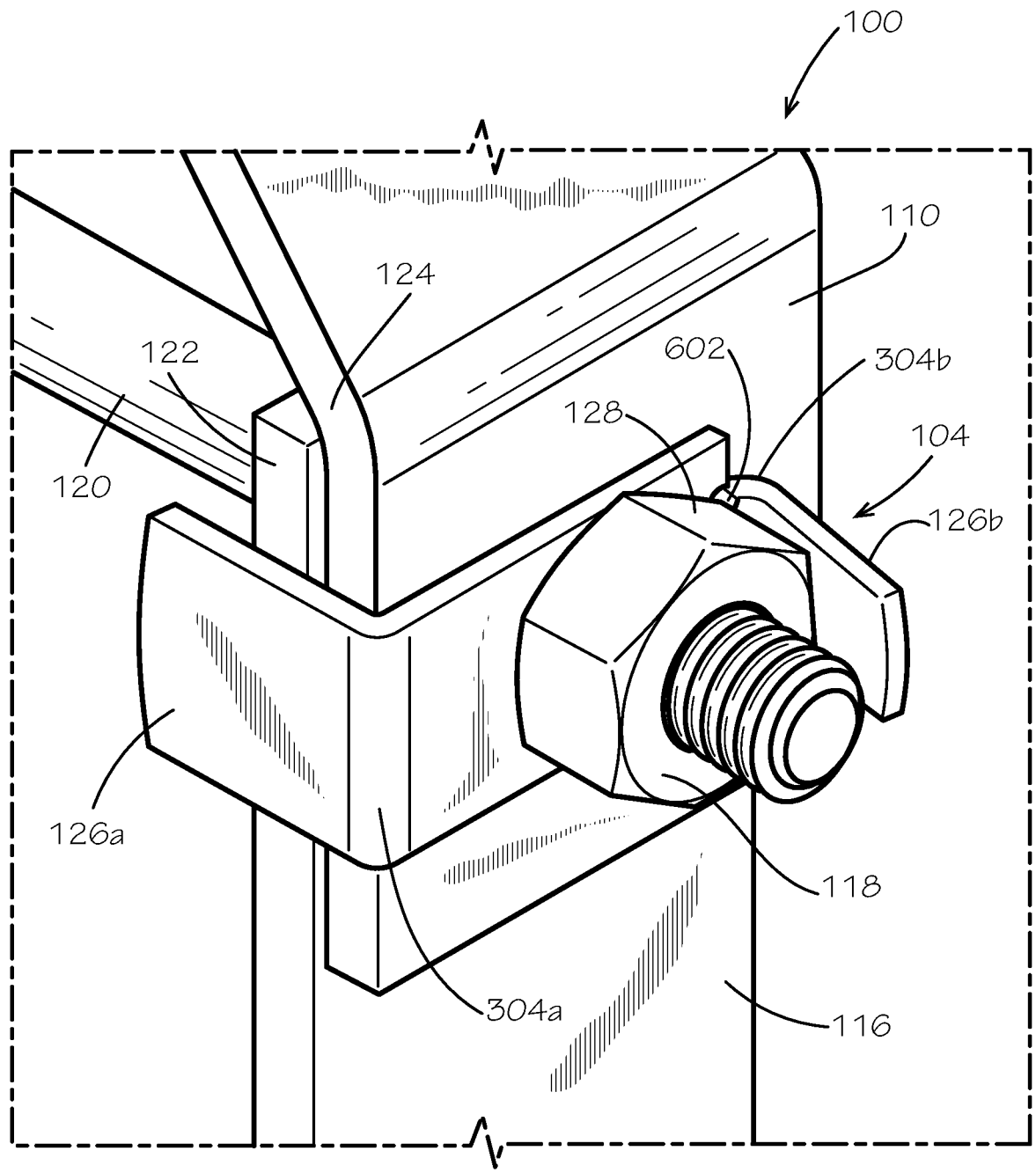
FIG. 7 is a detail view of the hanger assembled with the washer of FIG. 6.

FIG. 7 is a detail view of the hanger 100 assembled with the washer 104 of FIG. 6 in the location of washer 104b of FIG. 1. The washer 104 can be placed on the bolt 120 outside and adjacent the upper clevis 110, and the side nut 118 can be threaded on the bolt 120 over the washer 104. The edge tab 126a can fold at the first bend line 304a (which can also be called the edge bend line 304a) over the side edges 124,122 of the upper and lower clevises 110,116, respectively. The nut tab 126b can fold at the second bend line 304b (which can also be called the nut bend line 304b) over the circumferential side 128 of the nut 118. The relief notches 602 can relief to the washer 104 at the nut bend line 304b, such that the washer 104 is less likely to rip or tear.

Figure 8:
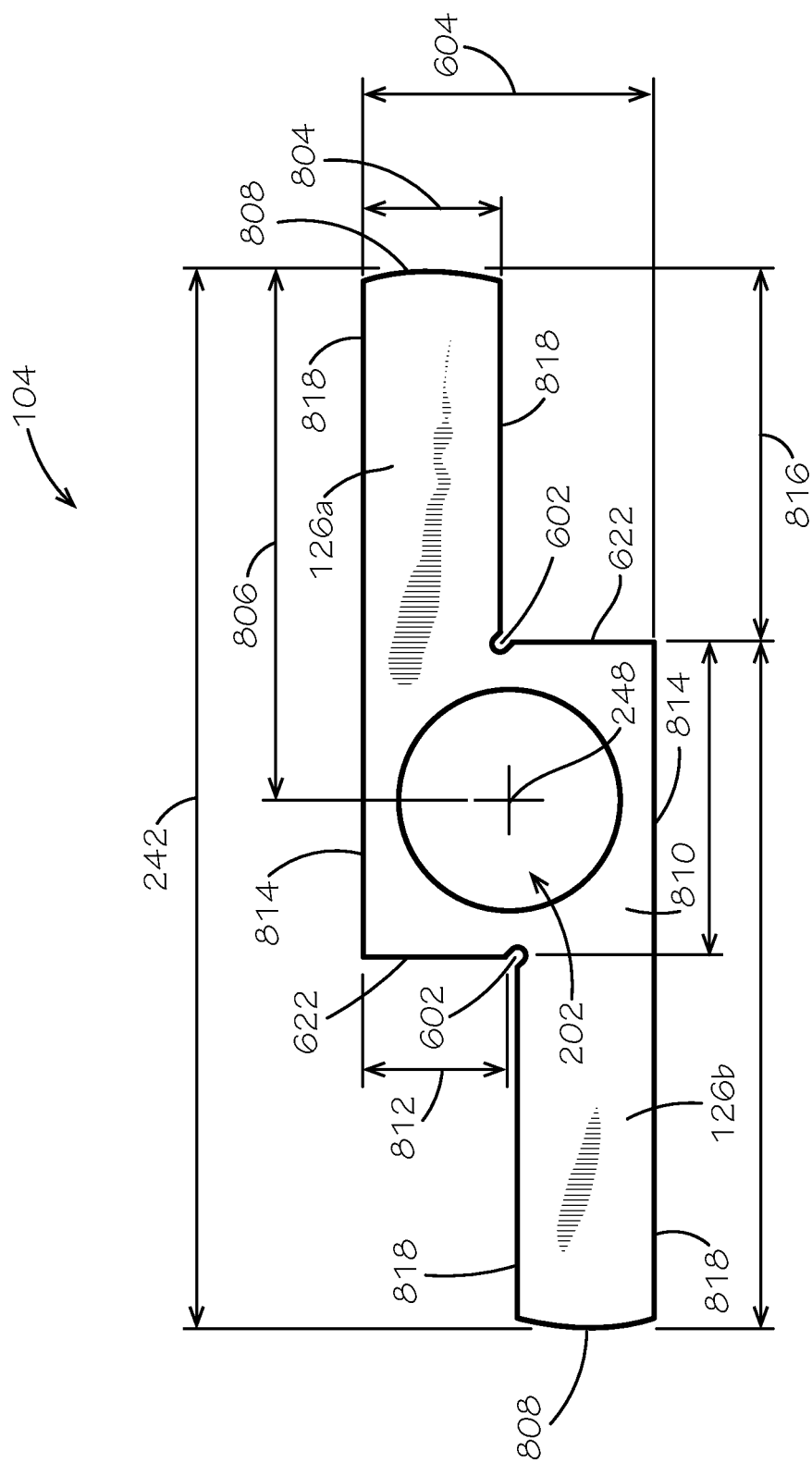
FIG. 8 is a top view of the lock tab washer in accordance with another aspect of the present disclosure.

FIG. 8 is a top view of the lock tab washer 104, in accordance with another aspect of the present disclosure. In the present aspect, the edge tab 126a and the nut tab 126b can be on opposing sides of the washer hole 202 and can extend in opposite directions that are offset but parallel. The tabs 126a,b can be approximately the same size and shape, and they can extend from a central portion 810 defining the washer hole 202. The washer 104 can have a 180-degree rotation symmetry about the hole center 248. The tabs can comprise tab ends 808 that are curvilinear. The tabs 126a,b can define tab lengths 816. The symmetric tabs can define a tab width 804. The hole center 248 and the tab end 808 can define a distance 806 therebetween. The central portion 810 can approximately be a square and can comprise two central lateral edges 814. A distance 812 between the hole center 248 and each central lateral edge 814 can be defined. The central portion 810 can also comprise two shoulders 622, each of which meet a tab lateral edge 818 at the relief notch 602.

Figure 9:
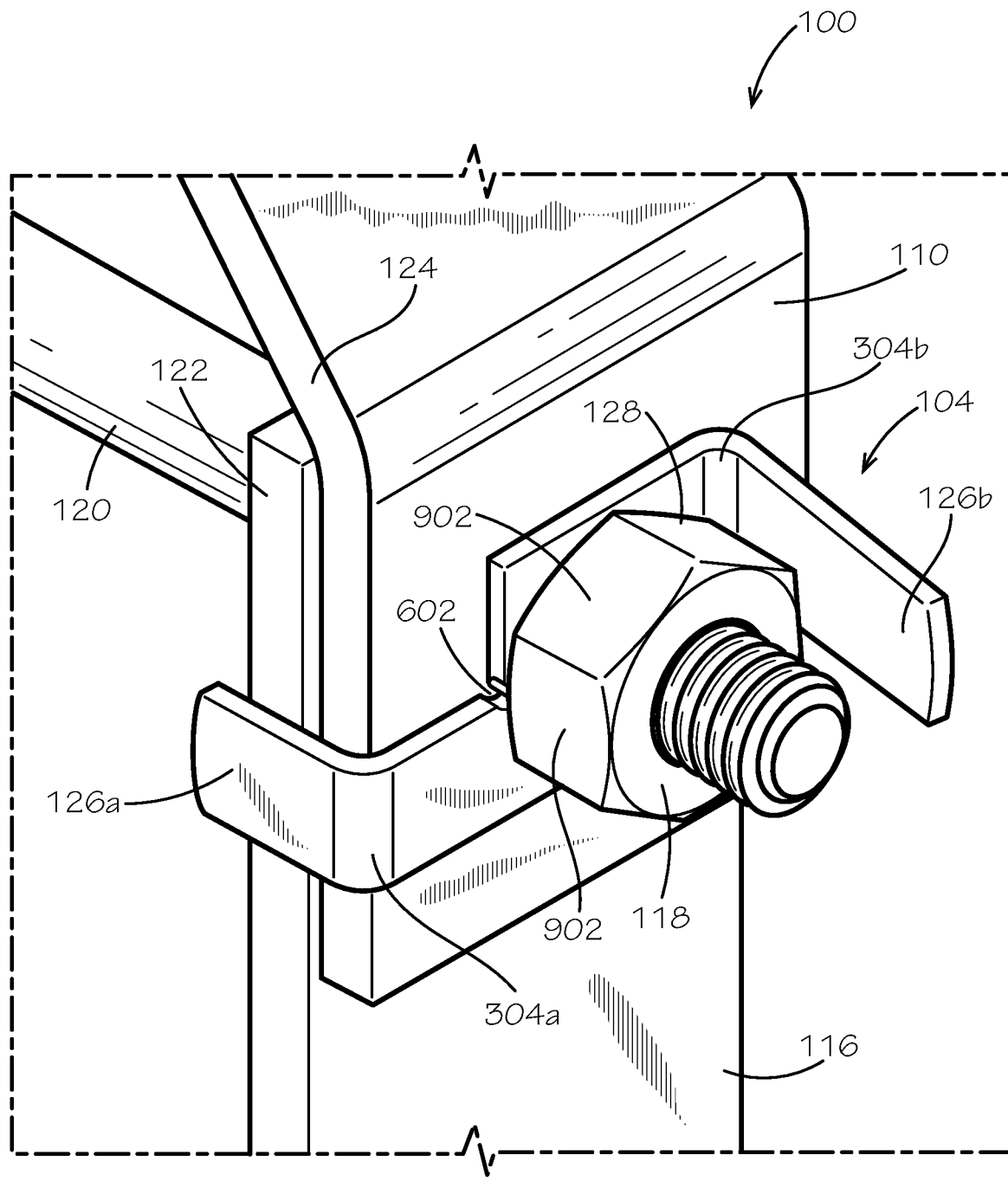
FIG. 9 is a detail view of the hanger assembled with the washer of FIG. 8.

FIG. 9 is a detail view of the hanger 100 assembled with the washer 104 of FIG. 8 in the location of washer 104b of FIG. 1. The placement of the washer 104 on the bolt 120 and the location of the bend lines 304a,b can be substantially the same as shown and described in FIG. 7. In the current aspect, either tab 126 can be the nut tab 126b, with the other tab 126 being the edge tab 126a. The circumferential side 128 of the nut 118 can form a polygon, such as a hexagon for the hex nut 114,118. Each edge of the polygon can define a side face 902 of the nut 114,118. For example, the hex nut 114,118 has six side faces 902. Each side face 902 can also be called a flat 902 of the circumferential side 128.

Because the nut tab 126b in the current aspect is offset to one lateral side of the washer 104, the nut tab 126b may contact only half of a side face 902. In comparison, the nut tab 126b in the aspect of FIG. 7, which fully covers one of the side faces 902, may provide for greater vibration resistance than the one shown in FIG. 9. The lock tab washer 104 of FIG. 9, however, may leave less unused material behind when it is stamped from a sheet, relative to the washer 104 of FIG. 7.

Figure 10:
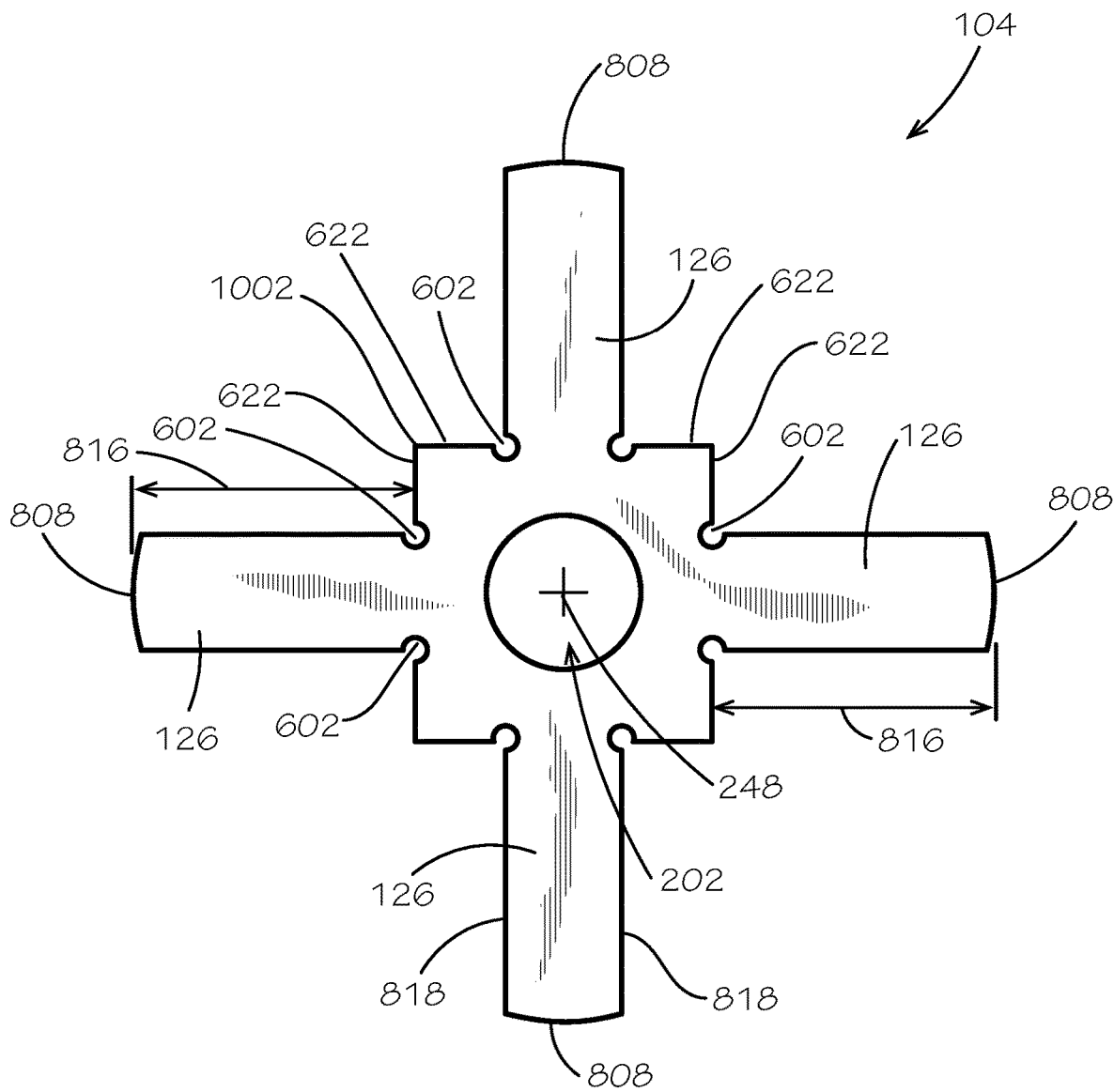
FIG. 10 is a top view of the lock tab washer in accordance with another aspect of the present disclosure.

FIG. 10 is a top view of the lock tab washer 104 in a flat configuration, in accordance with another aspect of the present disclosure. The washer 104 can comprise four tabs 126, each of which can have a substantially similar size and shape, such that any one of the tabs 126 can be an edge tab 126a (shown in FIG. 11) or a nut tab 126b (shown in FIG. 11). As such, the tab lengths 816 can be substantially the same. The washer can have 90-degree rotation symmetry about the hole center 248. The tab ends 808 can be curvilinear. The tab lateral edges 818 can each meet one of the shoulders 622 at one of the relief notches 602. The shoulders can meet at a shoulder corner 1002.

Figure 11:
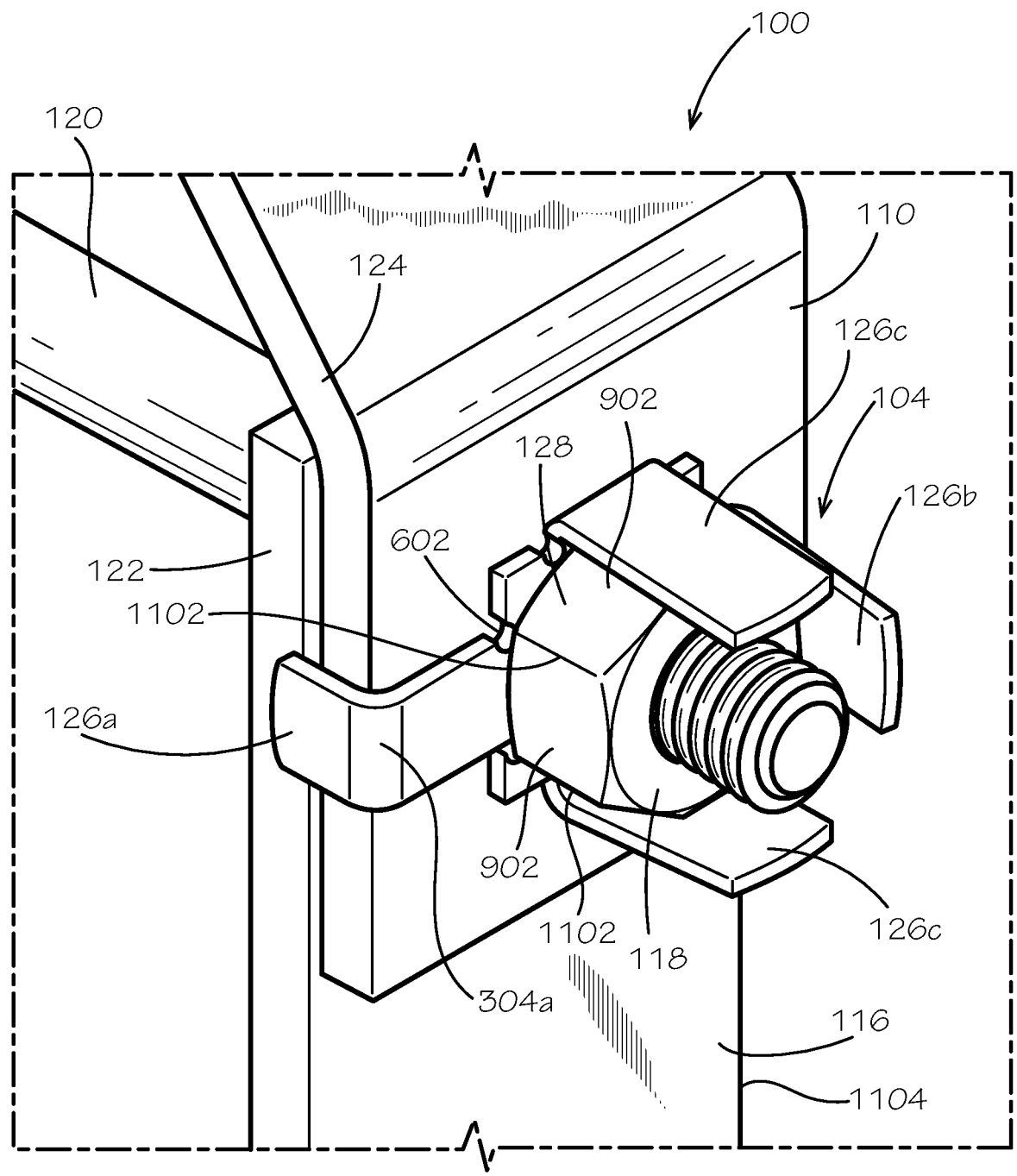
FIG. 11 is a detail view of the hanger assembled with the washer of FIG. 10.

FIG. 11 is a detail view of the hanger 100 assembled with the washer 104 of FIG. 10 in the location of washer 104b of FIG. 1. In the current aspect, one of the tabs 126 can be the edge tab 126a, and the tab 126 opposite the edge tab 126a can be the nut tab 126b. The remaining tabs 126 can be lateral tabs 126c that are configured to bend adjacent to the nut circumferential side 128 and provide greater vibration resistance. In the present aspect, when the nut 118 is a hex nut 118, the lateral tabs 126c may not contact a substantial portion of one of the nut's 118 side faces 902. In other aspects, the lateral tabs 126c can be bent obliquely, or bent to conform to the circumferential side 128 of the nut 118, such that greater contact is made with one of the side faces 902.

One advantage of the lock tab washer 104 in the aspect of FIG. 10 is that assembly can be less dependent on the orientation of the nut 118. As shown in FIG. 11, lateral tabs 126c align with points 1102, rather than the flats 902 of the hex nut 118. In another aspect (not shown), the nut 118 can be rotated slightly, and the tab acting as the nut tab 126b of FIG. 11 might align with one of the points 1102 of the nut 118. The lateral tabs 126c can then align with the flats 902. In that aspect, the lateral tabs 126c of FIG. 11 can also be the nut tabs 126b (aspect not shown). The tab acting as the nut tab 126b in FIG. 11 can then bend against the side edge 1104 opposite side edges 122,124, such that two tabs 126 engage the clevises 110,116 and two tabs 126 engage a flat 902 of the nut 118.

Any of the washers 104 shown in FIGS. 6-11 can also be used as a top washer 104a on the upper clevis 110 adjacent to the securing nut 114. The presently disclosed lock tab washer 104 provides for several advantages over the currently-available solutions for vibration resistance. Personnel can see with the naked eye whether a lock tab washer 104 has been installed; they can also see when, for example, the edge tab 126a of the washer 104 has slipped past the side edge 124, 122 of the upper or lower clevises 110,116. Thus, personnel can easily identify when replacement of the washer 104 or retightening of the nut 108,118 is necessary. Such advantages are particularly useful in the art of suspending pipes 102, since the pipes 102 may be located in areas that may not receive regular maintenance, and because the consequence of a falling pipe 102 due to a loose nut 114,118 may be catastrophic. In addition, the lock tab washers 104 can provide for greater protection against intentional or unintentional removal of the nut 118 from the bolt 120, because the washers positively engage lateral side edges of each of the nuts 114,118 and clevises 110,116.

The lock tab washer 104 can be used to suspend pipes 102 from ceilings as low as five feet or less (such as on submarines), to ceilings as high as 16 feet to 80 feet or more, as in some warehouses. The lock tab washer 104 can be sized with such definiteness as to allow visual inspection from the floor with the naked eye, for example. For some uses, the appropriate washer length 242 (such as for the aspect shown in FIG. 2A and FIG. 2B), may be 1.375 inches or less, or 2.875 inches or more. A larger washer 104 size may be more appropriate for uses in which the pipe 102 is suspended from a relatively high ceiling.

Further, in other aspects, the lock tab washer 104 of any of the previously described aspects can be used with any products, such as water and gas products, that utilize nuts 118 and bolts 120. In some aspects, for example and without limitation, the lock tab washer 104 can be used to hold a nut 118 onto a bolt 120 on a pipe coupling, a flanged connection between two pipe elements such as a valve and a pipe 102, pipe clamps, and seismic braces.

Figure 12:
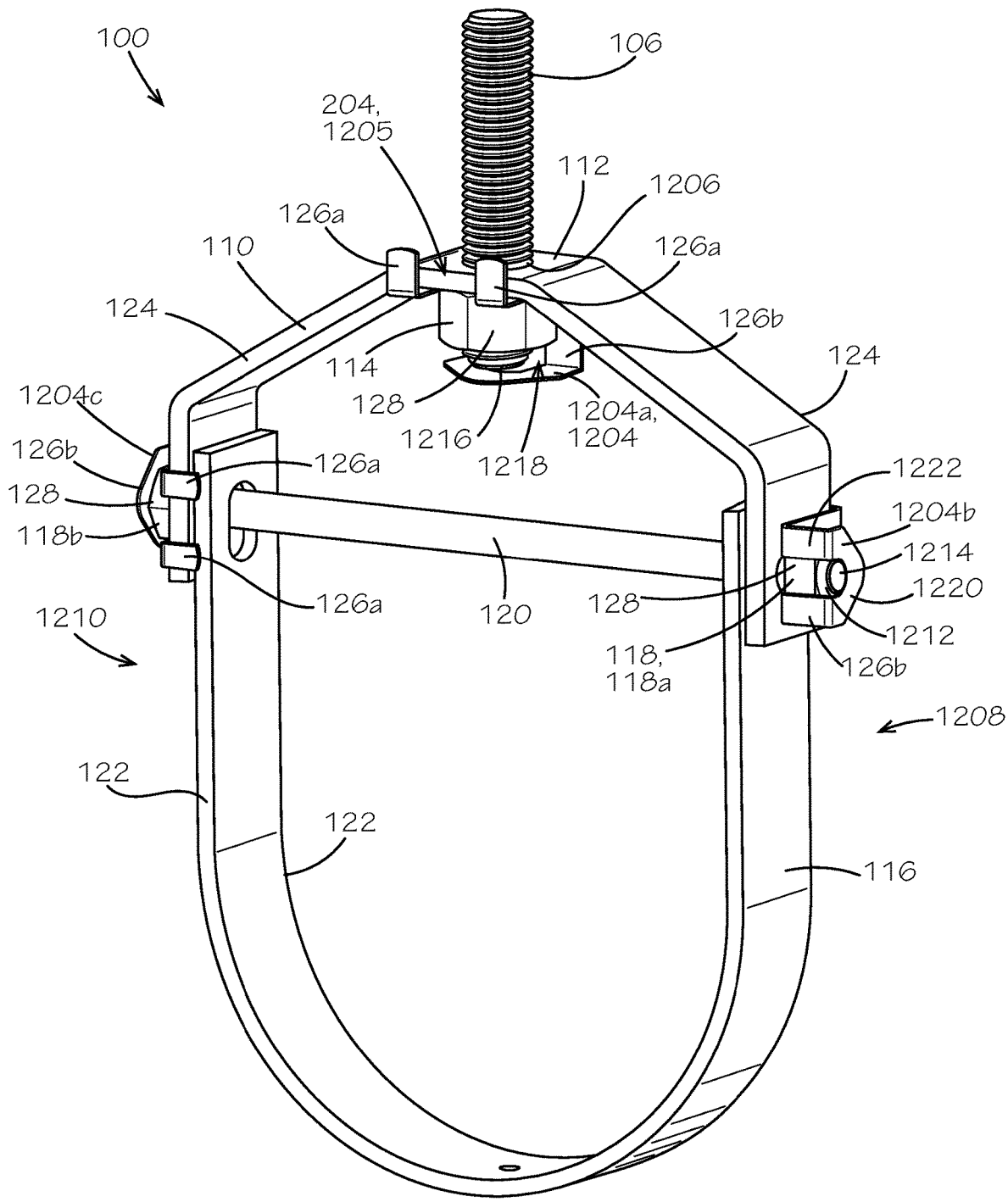
FIG. 12 is a perspective view of the hanger comprising an anti-vibration washer according to another aspect of the present disclosure.

FIG. 12 is a perspective view of the pipe hanger 100 comprising one or more anti-vibration washers 1204 in place of the lock tab washers 104 (shown in FIG. 1). The anti-vibration washers 1204 can comprise a metal material, such as steel or aluminum, for example and without limitations. In other aspects, the anti-vibrations washers 1204 can comprise any other suitable material, including various ductile metals, polymers, and the like. In some aspects, the anti-vibration washers 1204 can be brightly colored or highly reflective to be visible from a distance, such as from the ground during inspection. For example, the anti-vibration washers 1204 can be colored orange, red, yellow, or any other suitable bright color. In other aspects, however, the anti-vibration washers 1204 may not be brightly colored and/or reflective.

In the present aspect, the hanger 100 can comprise three of the anti-vibration washers 1204 (such as a top anti-vibration washer 1204a, a first side anti-vibration washer 1204b, and a second side anti-vibration washer 1204c), which can be similar to the lock tab washers 104 disclosed above. The hanger 100 can be the clevis hanger 100 and can comprise the threaded rod 106 and the upper clevis 110 disposed on the threaded rod 106. The upper clevis 110 can receive the threaded rod 106 through a rod hole 1206 in the top flattened section 112 of the upper clevis 110. The top anti-vibration washer 1204a can be placed on the threaded rod 106 below the rod hole 1206, relative to the orientation shown. The top securing nut 114 can be disposed on the threaded rod 106 generally below the top anti-vibration washer 1204a.

Example aspects of the pipe hanger 100 can further comprise the lower clevis 116 and the bolt 120 (e.g., the threaded rod 120) for securing the lower clevis 116 to the upper clevis 110. The lower clevis 116 can be configured to hold the pipe 102 (shown in FIG. 1), and in the present aspect, can be formed a U-shaped strap, as shown. The bolt 120 can extend through corresponding upper bolt holes 1702 (shown in FIG. 17) and lower bolt holes 1704 (shown in FIG. 17) of the upper and lower clevises 110,116, respectively, at a first hanger side 1208 of the pipe hanger 100 and at a second hanger side 1210 of the pipe hanger 100. In the present aspect, the pipe hanger 100 can further comprise a first side nut 118a of the side nuts 118 disposed on the bolt 120 at the first hanger side 1208 and a second side nut 118b of the side nuts 118 disposed on the bolt 120 at the second hanger side 1210. Each of the first and second side anti-vibration washers 1204b,c can be disposed generally between the upper clevis 110 and the corresponding first or second side nut 118a,b at either the first hanger side 1208 or the second hanger side 1210, respectively.

According to example aspects, each of the anti-vibration washers 1204 of the present aspect can comprise a pair of the edge tabs 126a. The edge tabs 126a can be oriented substantially parallel with one another, and the slit 204 can be defined therebetween. The slit 204 can be configured to receive the corresponding threaded rod 106 or bolt 120. In the present aspect, the slit 204 can define a substantially wider slot 1205 than the slit 204 shown in the previous aspects, such that the slot 1205 can be sized to receive the corresponding threaded rod 106 or the bolt 120 therethrough. Each of the edge tabs 126a can be bent to fold over one of the side edges 124 of the upper clevis 110, as described above. In some aspects, each of the edge tabs 126a of the first and second side anti-vibration washers 1204b,c can extend beyond the side edge 124 of the upper clevis 110 to the corresponding side edge 122 of the lower clevis 116.

Each of the anti-vibration washers 1204 can further comprise one of the nut tabs 126b The nut tab 126b can be bent to fold over the circumferential side 128 of the corresponding top securing nut 114 or side nut 118, as described above. Moreover, in the present aspect, a distal portion 1220 of the nut tab 126b of the first and second side anti-vibration washers 1204b,c can further be bent relative to a proximal portion 1222 of the nut tab 126b to fold over an outer nut end 1212 of the corresponding side nut 118 and over a corresponding distal bolt end 1214 of the bolt 120. Similarly, the distal portion 1220 of the nut tab 126b of the top anti-vibration washer 1204a can further be bent relative to the proximal portion 1222 to fold over the outer nut end 1212 of the corresponding top securing nut 114 and a corresponding distal rod end 1216 of the threaded rod 106. The distal portions 1220 of the nut tabs 126b can be configured to limit or prevent axial movement of the bolt 120 and the threaded rod 106, as described in further detail below. In some aspects, as shown, a tab opening 1218 can be defined through the nut tab 126b to facilitate folding the nut tab 126b around the corresponding top securing nut 114 or side nut 118.

Figure 13:
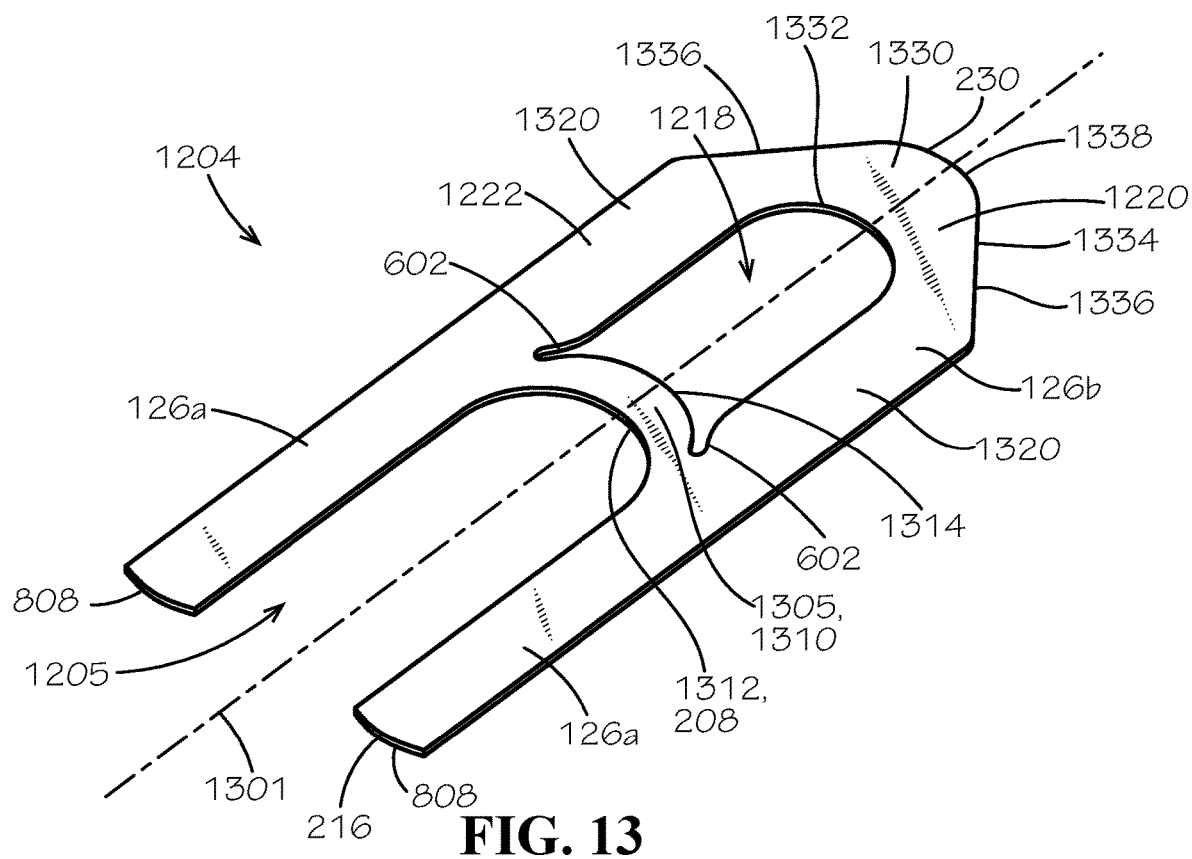
FIG. 13 is a perspective view of the anti-vibration washer of FIG. 12 in a flat configuration.

FIG. 13 illustrates a perspective view of the anti-vibration washer 1204 in the flat configuration. In the present aspect, the anti-vibration washer 1204 can be substantially symmetric about a longitudinal axis 1301. As shown, the anti-vibration washer 1204 can comprise two of the edge tabs 126a extending from a body 1305 of the anti-vibration washer 1204 towards the second end 216 of the anti-vibration washer 1204. The anti-vibration washer 1204 can further comprise the nut tab 126b extending from the body 1305 towards the first end 230 of the anti-vibration washer 1204. In the present aspect, the body 1305 of anti-vibration washer 1204 can comprise a crosspiece 1310. The edge tabs 126a can be oriented substantially parallel with one another, and the slot 1205 can be defined therebetween. In example aspects, an inside edge 1312 of the crosspiece 1310, which can define the closed end 208 of the slot 1205 can be substantially arcuate or curved, as shown. For example, the inside edge 1312 of the crosspiece 1310 can be substantially concave (i.e., can arc into the crosspiece 1310 towards the first end 230 of the anti-vibration washer 1204), and the threaded rod 106 (shown in FIG. 12) or the bolt 120 (shown in FIG. 12) can be configured to confront or abut the arcuate closed end 208 of the slot 1205. In other aspects, the inside edge 1312 of the crosspiece 1310 can be substantially linear or can define any other suitable shape. Furthermore, in example aspects, the distal tab end 808 of each edge tab 126a can be substantially curved or arcuate. In other aspects, the distal tab ends 808 can be substantially linear or can define any other suitable shape.

The tab opening 1218 can be formed through the nut tab 126b of the anti-vibration washer 1204, and an outside edge 1314 of the crosspiece 1310 can at least partially define the tab opening 1218. As shown, the outside edge 1314 of the crosspiece 1310 can be substantially curved or arcuate, though in other aspects, the outside edge 1314 can be substantially linear or can define any other suitable shape. For example, in the present aspect, the outside edge 1314 can be substantially convex (i.e., can arc outward from the crosspiece 1310 towards the first end 230 of the anti-vibration washer 1204). Example aspects of the nut tab 126b can define a pair of tab legs 1320 each extending from the crosspiece 1310. The tab legs 1320 can be oriented substantially parallel to one another, and the tab opening 1218 can be formed therebetween. In some aspects, the tab opening 1218 can define a pair of the recessed relief notches 602. Each of the relief notches 602 can be defined generally at the joint between the crosspiece 1310 and a corresponding one of the tab legs 1320. In some aspects, the relief notches 602 can be substantially curvilinear, as described above. The relief notches 602 can be configured to facilitate folding the nut tab 126 relative to the crosspiece 1310. Other aspects of the anti-vibration washer 1204 may not comprise the relief notches 602.

According to example aspects, the distal portion 1220 of the nut tab 126b can comprise a tab end 1330 extending between the tab legs 1320 at the first end 230 of the anti-vibration washer 1204. An inside edge 1332 of the tab end 1330 can be substantially arcuate or curved in the present aspect, but may be substantially linear or otherwise shaped in other aspects. For example, as shown, the inside edge 1332 of the tab end 1330 can be substantially concave (i.e., can arc into the tab end 1330 towards the first end 230 of the anti-vibration washer 1204). The tab end 1330 can also define an outside edge 1334, which, in the present aspect, can define a straight side portion 1336 tapering inward from each of the tab legs 1320 towards the first end 230. Thus, a width of the tab end 1330 can taper towards the first end 230, as shown. The outside edge 1334 can further define a substantially curved and convex tip portion 1338 connecting and arcing outward from the straight side portions 1336 at the first end 230. In other aspects, the outside edge 1334 of the tab end 1330 can define any other suitable profile.

Figure 14:
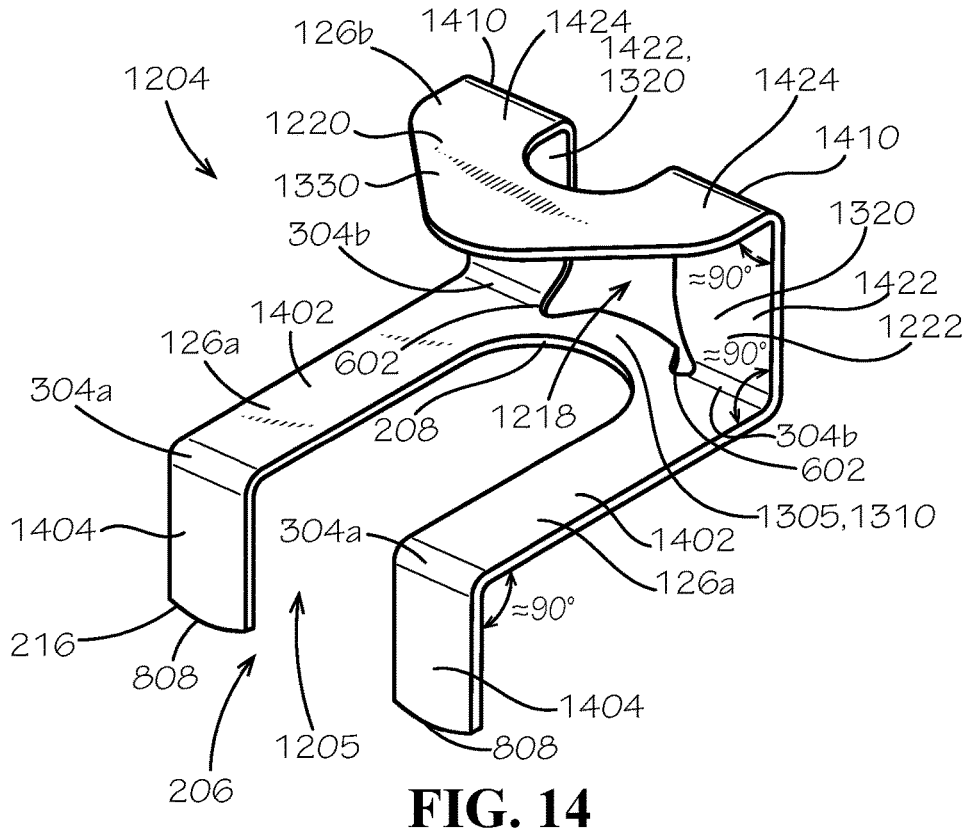
FIG. 14 is a perspective view of the anti-vibration washer of FIG. 12 in a folded configuration.
Figure 15:
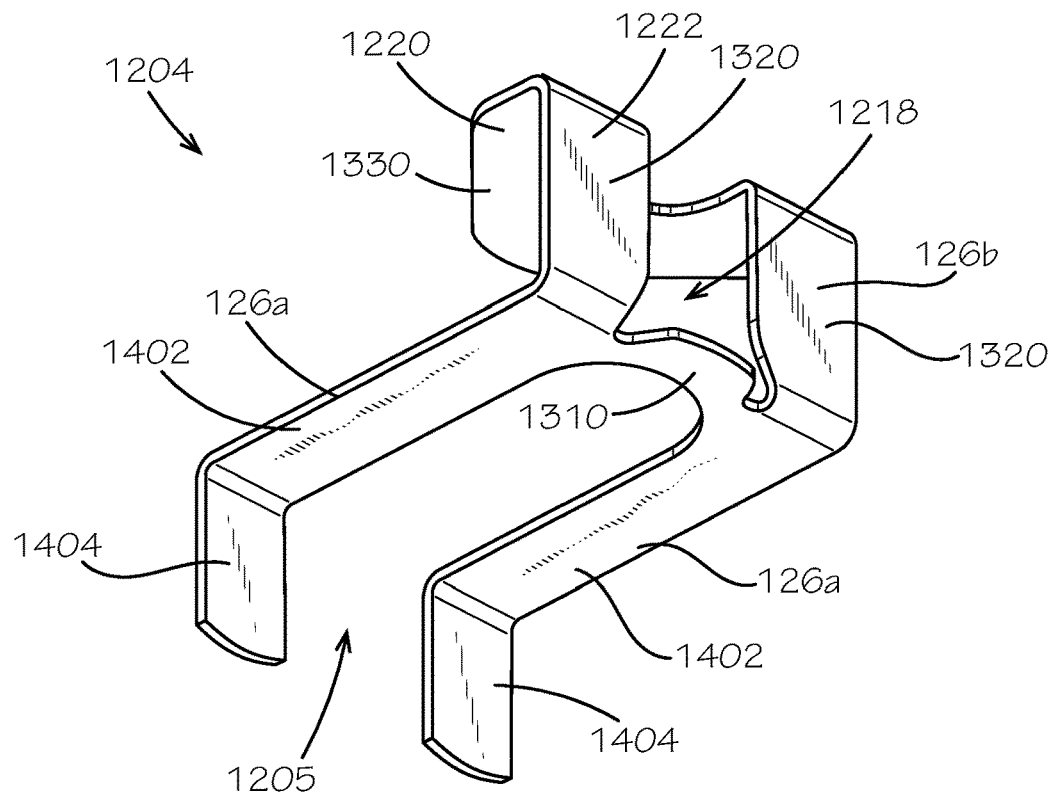
FIG. 15 is another perspective view of the anti-vibration washer of FIG. 12 in the folded configuration.
Figure 16:
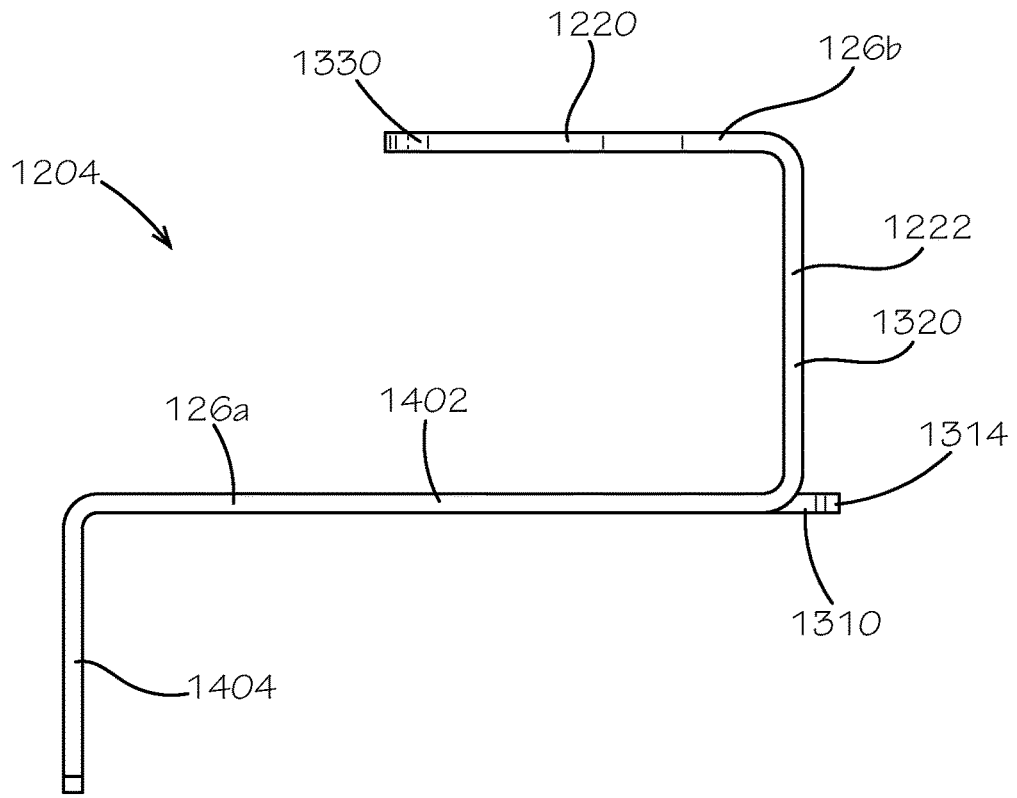
FIG. 16 is a side view of the anti-vibration washer of FIG. 12 in the folded configuration.

FIGS. 14 and 15 each illustrate a perspective view of the anti-vibration washer 1204 in the folded configuration, and FIG. 16 illustrates a side view of the anti-vibration washer 1204 in the folded configuration. According to example aspects, each of the edge tabs 126a can define a first tab section 1402 proximate to the crosspiece 1310 and a second tab section 1404 extending from the first tab section 1402 to the corresponding tab end 808. The second tab section 1404 can be bent relative to the first tab section 1402 at a corresponding one of the first bend lines 304a. The first bend lines 304a can be defined between the closed end 208 and the open end 206 of the slot 1205 (i.e., between the crosspiece 1310 and the second end 216 of the anti-vibration washer 1204). The second tab section 1404 of each edge tab 126a can be bent in a first direction, which can be a substantially downward direction relative to the orientation shown. In example aspects, each of second tab sections 1404 can be bent at about 90° relative to the corresponding first tab sections 1402.

Furthermore, the nut tab 126b can be bent relative to the crosspiece 1310. Specifically, each of the tab legs 1320 of the nut tab 126b can be bent relative to the crosspiece 1310 at a corresponding one of the second bend lines 304b. The nut tab 126b can be bent in a second direction substantially opposite the first direction, which can be a substantially upward direction relative to the orientation shown. In example aspects, the tab legs 1320 of the nut tab 126b can be bent at about 90° relative to the crosspiece 1310, and the relief notches 602 of the tab opening 1218 can facilitate bending the tab legs 1320. In example aspects, as best seen in the side view of FIG. 16, the outside edge 1314 of the crosspiece 1310 can extend laterally beyond the tab legs 1320 in the folded configuration.

Additionally, the distal portion 1220 of the nut tab 126b, including the tab end 1330, can be bent relative to the proximal portion 1222 at corresponding distal bend lines 1410. In example aspects, the distal portion 1220 can be bent at about 90° relative to the proximal portion 1222, and the tab opening 1218 can allow for easier bending of the distal portion 1220. In some aspects, the distal bend lines 1410 can be defined at the juncture between the tab legs 1320 and the tab end 1330. In other aspects, as shown, the distal bend lines 1410 can be defined along the tab legs 1320, between the crosspiece 1310 and the tab end 1330. In the present aspect, the distal bend lines 1410 can formed along the tab legs 1320 proximate to the tab end 1330. In such an aspect, each of the tab legs 1320 can define a first leg section 1422 extending from the crosspiece 1310 to the corresponding distal bend line 1410 and a second leg section 1424 extending from the distal bend line 1410 to the tab end 1330. Thus, in the present aspect, the distal portion 1220 of the nut tab 126b can include both the tab end 1330 and the second leg sections 1424 of the tab legs 1320, and the proximal portion 1222 of the nut tab 126 can include the first leg sections 1422 of the tab legs 1320. According to example aspects, the distal portion 1220 can be bent towards the second end 216 of the anti-vibration washer 1204, and can be oriented about parallel to the first tab sections 1402 of the edge tabs 126a and the crosspiece 1310. Moreover, the distal portion 1220 can be oriented about perpendicular to the second tab sections 1404 of the edge tabs 126a and the first leg sections 1422 of the tab legs 1320. In the present aspect, the tab end 1330 can be substantially coplanar with the second leg sections 1424 of the tab legs 1320.

As such, according to example aspects, a method of folding the anti-vibration washer 1204 from the flat configuration to the folded configuration can comprise bending the second tab section 1404 of each edge tab 126a relative to the first tab section 1402 of the edge tab 126a at the corresponding first bend lines 304a, bending the nut tab 126b relative to the crosspiece 1310 at the second bend lines 304b, and bending the distal portion 1220 of the nut tab 126b relative to the proximal portion 1222 of the nut tab 126b at the distal bend lines 1410.

Figure 17:
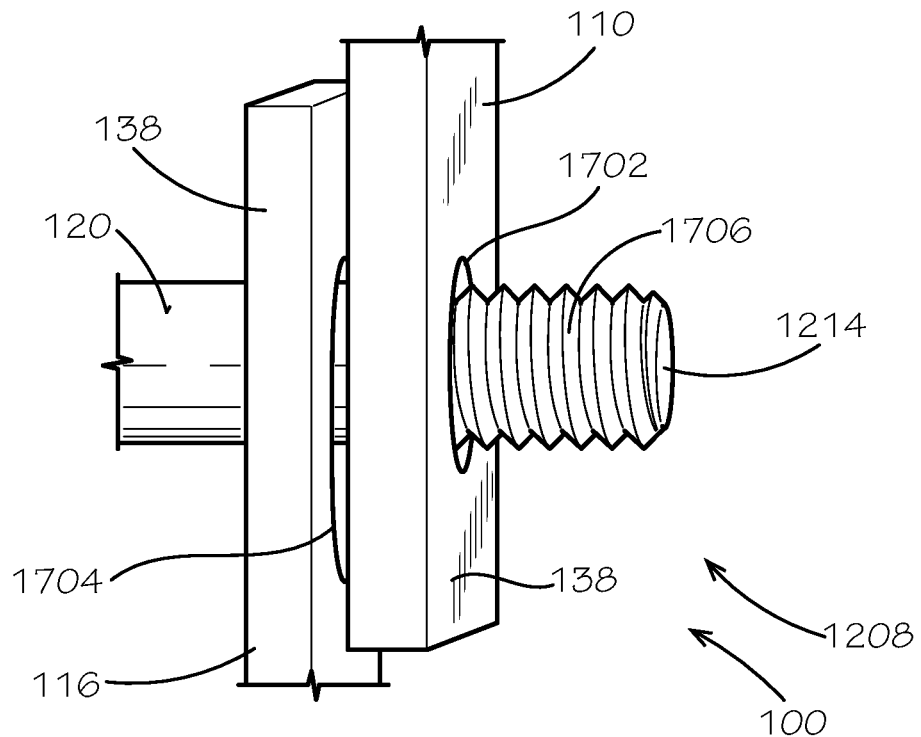
FIG. 17 is a detail view of the hanger prior to installing the anti-vibration washer of FIG. 12 thereon.

FIG. 17 illustrates a detail view of the first hanger side 1208 of the pipe hanger 100, which can also be representative of the second hanger side 1210 (shown in FIG. 12). As shown, each of the upper and lower clevises 110,116 can comprise the flattened ends 138. Each flattened end 138 of the upper clevis 110 can define one of the upper bolt holes 1702 therethrough, and each flattened end 138 of the lower clevis 116 can define one of the lower bolt holes 1704 therethrough. A threaded end portion 1706 of the bolt 120 can be inserted through the corresponding upper bolt hole 1702 and lower bolt hole 1704. In the present aspect, the flattened end 138 of the upper clevis 110 can overlap the flattened end 138 of the lower clevis 116, such that the flattened end 138 of the upper clevis 110 is disposed external to the flattened end 138 of the lower clevis 116. However, in other aspects, the flattened end 138 of the lower clevis 116 can overlap the flattened end 138 of the upper clevis 110.

Figure 18:
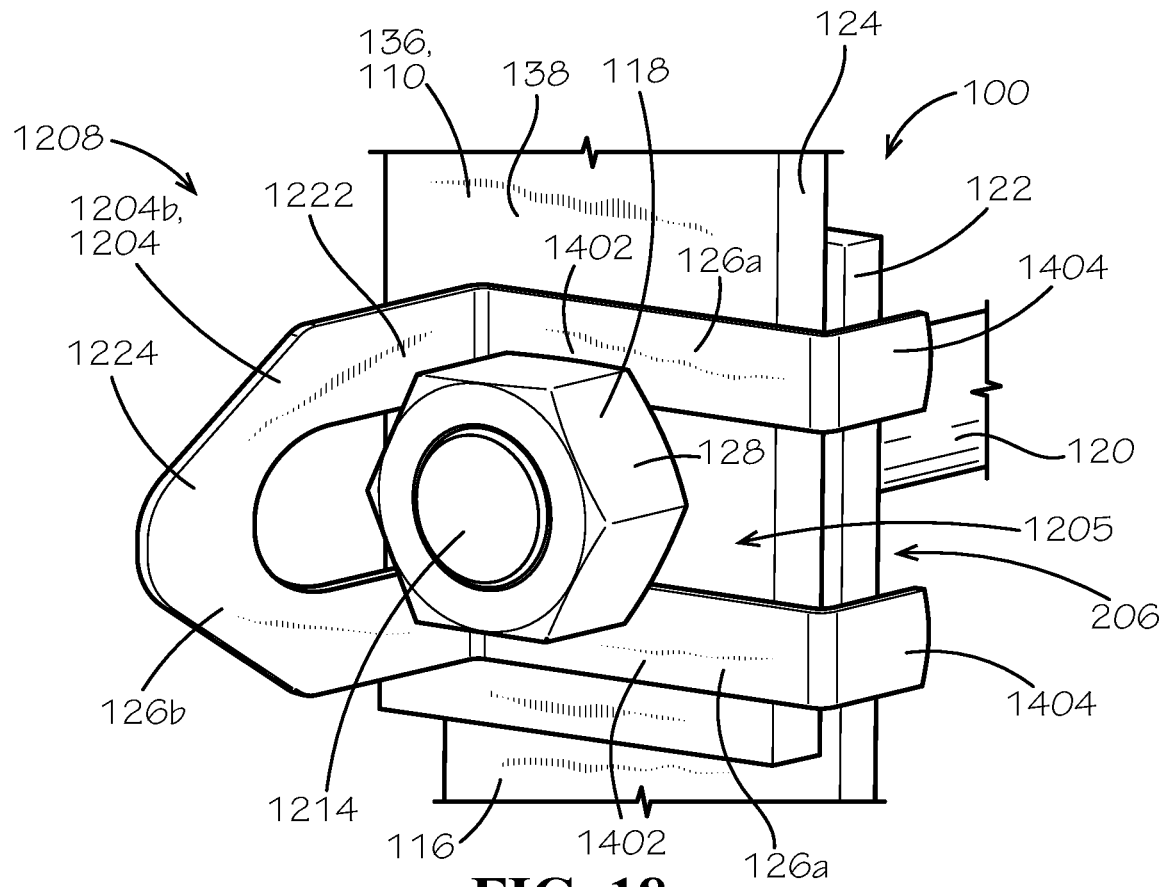
FIG. 18 is a perspective of the hanger with the anti-vibration washer of FIG. 12 installed thereon in a partially folded configuration.

FIG. 18 illustrates the anti-vibration washer 1204 partially installed on the pipe hanger 100. Specifically, FIG. 18 shows the first side anti-vibration washer 1204b partially installed at the first hanger side 1208 of the pipe hanger 100. According to example aspects, the threaded end portion 1706 (shown in FIG. 17) of the bolt 120 can be inserted through the slot 1205 of the anti-vibration washer 1204 to mount the anti-vibration washer 1204 on the bolt 120. The threaded end portion 1706 can be positioned at or near the closed end 208 (shown in FIG. 13) of the slot 1205 (i.e., proximate to the crosspiece 1310, shown in FIG. 19). The corresponding side nut 118 can be threaded onto the threaded end portion 1706 to secure the bolt 120 to the suspension member 136 (i.e., the upper and lower clevises 110,116), and the side nut 118 can be tightened to sandwich a portion of the first tab section 1402 of each edge tab 126a between the side nut 118 and the flattened end 138 of the upper clevis 110.

In other aspects, the anti-vibration washer 1204 can be retrofitted onto a pre-assembled suspension member 136, wherein the side nut 118 is already threaded onto the bolt 120. To install the anti-vibration washer 1204 on a pre-assembled suspension member 136, the side nut 118 can be loosened and the anti-vibration washer 1204 can be slid laterally onto the threaded end portion 1706 of the bolt 120. The anti-vibration washer 1204 can be slid laterally onto the bolt 120 by laterally inserting the edge tabs 126a between the upper clevis 110 and the side nut 118, with the threaded end portion 1706 laterally engaging the slot 1205 through the open end 206 thereof. The side nut 118 can then be re-tightened to sandwich the first tab section 1402 of each edge tab 126a between the side nut 118 and the upper clevis 110.

Furthermore, as described above, the second tab section 1404 of each edge tab 126a can be folded over the side edge 124 of the upper clevis 110 (and in some cases, over the side edge 122 of the lower clevis 116) to prevent the anti-vibration washer 1204 from rotating relative to the suspension member 136. Moreover, the nut tab 126b can be folded over the circumferential side 128 of the side nut 118 to prevent the side nut 118 from rotating relative to the anti-vibration washer 1204, as described above. In the present aspect, the tab legs 1320 of the nut tab 126b can confront or engage adjacent side faces 902a,b (shown in FIG. 19) of the side nut 118.

Figure 19:
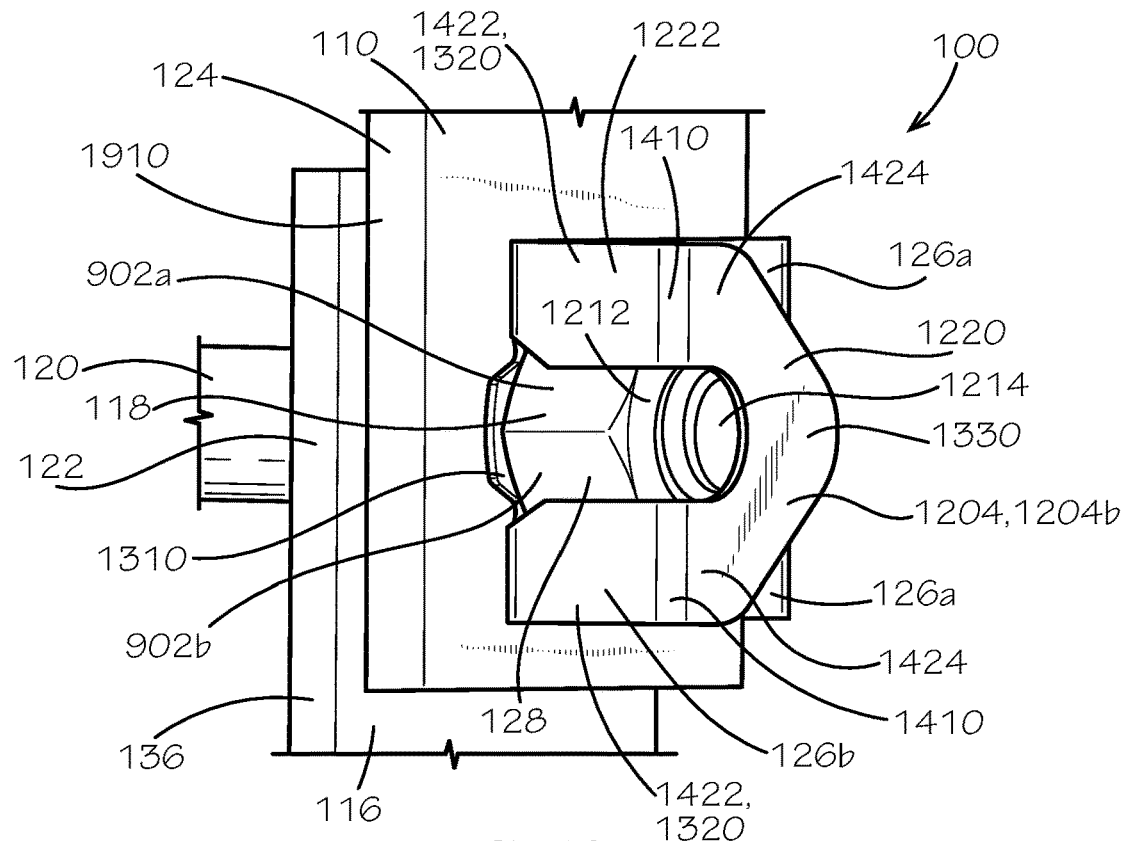
FIG. 19 is a perspective view of the hanger with the anti-vibration washer of FIG. 12 installed thereon in the folded configuration.
Figure 20:
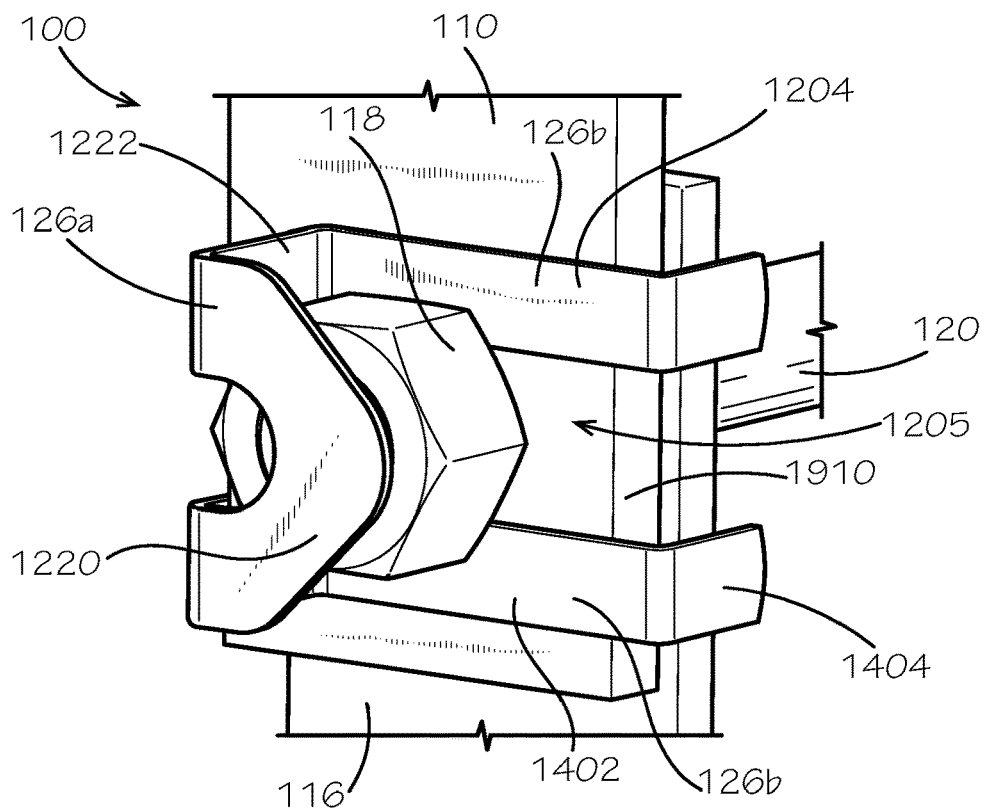
FIG. 20 is another perspective view of the hanger with the anti-vibration washer of FIG. 12 installed thereon in the folded configuration.

FIGS. 19 and 20 illustrate perspective views of the anti-vibration washer 1204 installed on the pipe hanger 100. As shown, the distal portion 1220 of the nut tab 126b (which includes the tab end 1330 and the second leg sections 1424 of the tab legs 1320 in the present aspect) can be folded at the distal bend lines 1410 relative to the first leg sections 1422 of the tab legs 1320 to fold the distal portion 1220 over the outer nut end 1212 of the side nut 118 and the distal bolt end 1214 of the bolt 120. The distal portions 1220 of the first side anti-vibration washer 1204b and the second side anti-vibration washer 1204c (shown in FIG. 12) folded over opposing distal bolt ends 1214 of the bolt 120 can prevent or limit problematic axial movement of the bolt 120 due to vibrations. When vibrations cause the bolt 120 to move axially (i.e., towards the first hanger side 1208 or the second hanger side 1210, shown in FIG. 12), the bolt 120 can rotate relative to the side nuts 118, thereby loosening, and potentially unthreading, one or both of the side nuts 118 from the corresponding threaded end portion 1706 (shown in FIG. 17). The distal portion 1220 of the top anti-vibration washer 1204a (shown in FIG. 12) can similarly be folded over the outer nut end 1212 of the top securing nut 114 (shown in FIG. 12) and the distal rod end 1216 (shown in FIG. 12) of the threaded rod 106 (shown in FIG. 12) to prevent or limit axial movement of the threaded rod 106 due to vibrations.

Thus, according to example aspects, a method of assembling the pipe hanger 100 can comprise inserting the threaded end portion 1706 of the bolt 120 through the suspension member 136 and mounting the anti-vibration washer 1204 on the threaded end portion 1706. The anti-vibration washer 1204 can define at least one of the edge tabs 126a and the nut tab 126b. The method can further comprise tightening the corresponding side nut 118 on the threaded end portion 1706, wherein the side nut 118 can define the circumferential side 128 and the outer nut end 1212. At least a portion of the anti-vibration washer 1204 can be sandwiched between the suspension member 136 and the side nut 118. Example aspects of the method can further comprise folding the edge tab 126a over a side edge 1910 of the suspension member 136 (such as the side edge 124 of the upper clevis 110 and the side edge 122 of the lower clevis 116), folding the nut tab 126b over the circumferential side 128 of the nut tab 118, and folding the distal portion 1220 of the nut tab 126b over the outer nut end 1212 of the side nut 118 and the distal bolt end 1214 of the bolt 120.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pipe hanger comprising:
   a suspension member configured to engage a pipe, the suspension member comprising a side edge and defining a hole through the suspension member;
   a threaded rod extending through the hole and defining a distal rod end;
   a nut threaded on the threaded rod, the nut defining a circumferential side; and
   an anti-vibration washer disposed on the threaded rod between the suspension member and the nut, the anti-vibration washer comprising a body, an edge tab, and a nut tab;
   wherein:
      at least a portion of the edge tab is bent to fold over the side edge of the suspension member;
      the nut tab is bent to fold over the circumferential side of the nut;
      a distal portion of the nut tab is bent to fold over the distal rod end;
      the distal portion of the nut tab defines a tab end;
      the nut tab defines a tab opening therethrough to facilitate bending the nut tab relative to the body;
      the nut tab defines a first tab leg and a second tab leg, each of the first and second tab legs extending from the body to the tab end;
      the tab opening is defined between the first and second tab legs; and
      the tab opening defines a first relief notch formed between the first tab leg and the body and a second relief notch formed between the second tab leg and the body.

2. The pipe hanger of claim 1, wherein the edge tab defines a first tab section and a second tab section, the second tab section bent about 90° relative to the first tab section to fold the second tab section over the side edge of the suspension member.

3. The pipe hanger of claim 2, wherein:
   the body is disposed between the edge tab and the nut tab;
   the first tab section of the edge tab and a proximal portion of the nut tab extend from the body; and
   the first tab section of the edge tab is substantially coplanar with the body.

4. The pipe hanger of claim 3, wherein:
   the edge tab is a first edge tab;
   the anti-vibration washer further comprises a second edge tab parallel to the first edge tab;

a slot is defined between the first edge tab and the second edge tab, the slot defining an open end and a closed end; and the threaded rod extends through the slot.

5. The pipe hanger of claim 3, wherein:

the proximal portion of the nut tab is bent about 90° relative to the body to fold over the circumferential side of the nut;

the distal portion of the nut tab is bent about 90° relative to the proximal portion to fold over the distal rod end; and the tab end of the distal portion of the nut tab is distal to the body of the anti-vibration washer.

6. The pipe hanger of claim 1, wherein:

each of the first and second tab legs defines a first leg section adjacent to the body, a second leg section adjacent to the tab end, and a bend line between the first and second leg sections;

the distal portion of the nut tab is bent relative to proximal portions of the nut tab at the bend lines;

the proximal portions comprise the first leg section of the first tab leg and the first leg section of the second tab leg; and the distal portion comprises the second leg section of the first tab leg and the second leg section of the second tab leg.

* * * * *